United States Patent [19]

Powell et al.

[11] 4,020,334

[45] Apr. 26, 1977

[54] INTEGRATED ARITHMETIC UNIT FOR COMPUTING SUMMED INDEXED PRODUCTS

[75] Inventors: Noble R. Powell, Syracuse; John M. Irwin, Clay, both of N.Y.

[73] Assignee: General Electric Company, Syracuse, N.Y.

[22] Filed: Sept. 10, 1975

[21] Appl. No.: 611,923

[52] U.S. Cl. ............................................... 235/164
[51] Int. Cl.$^2$ ..................... G06F 7/48; G06F 15/34
[58] Field of Search ........................... 235/156, 164

[56] References Cited
UNITED STATES PATENTS

| | | | |
|---|---|---|---|
| 3,721,812 | 3/1973 | Schmidt | 235/156 |
| 3,754,128 | 8/1973 | Corinthios | 235/156 |
| 3,920,978 | 11/1975 | Schmitt et al. | 235/156 |

*Primary Examiner*—David H. Malzahn
*Attorney, Agent, or Firm*—Richard V. Lang; Carl W. Baker; Frank L. Neuhauser

[57] ABSTRACT

The invention relates to an integrated arithmetic unit for computing summed indexed products and suitable for fabrication by large scale integration techniques. The arithmetic unit comprises a vector adder and a vector multiplier. The vector adder includes a pair of serially connected summers each with one sign controlled input. The vector multiplier comprises two single precision multiplication logics whose outputs are each provided with a sign control. The appropriately signed outputs of the two multiplication logics are then summed to provide the output of the arithmetic unit. The input data are introduced and the processed output data, both of which may be complex, are derived from the unit in bit serial, word parallel computation when a greater speed of computation is required and used repetitively with suitable multiplexing provisions when a lesser speed of computation is required. A major application of the arithmetic units is in the computation of multiple point Fast Fourier Transforms (FFT). In the FFT application, the arithmetic units are normally operated in parallel with serial input and serial output memories for each paralleled sets of units.

13 Claims, 15 Drawing Figures

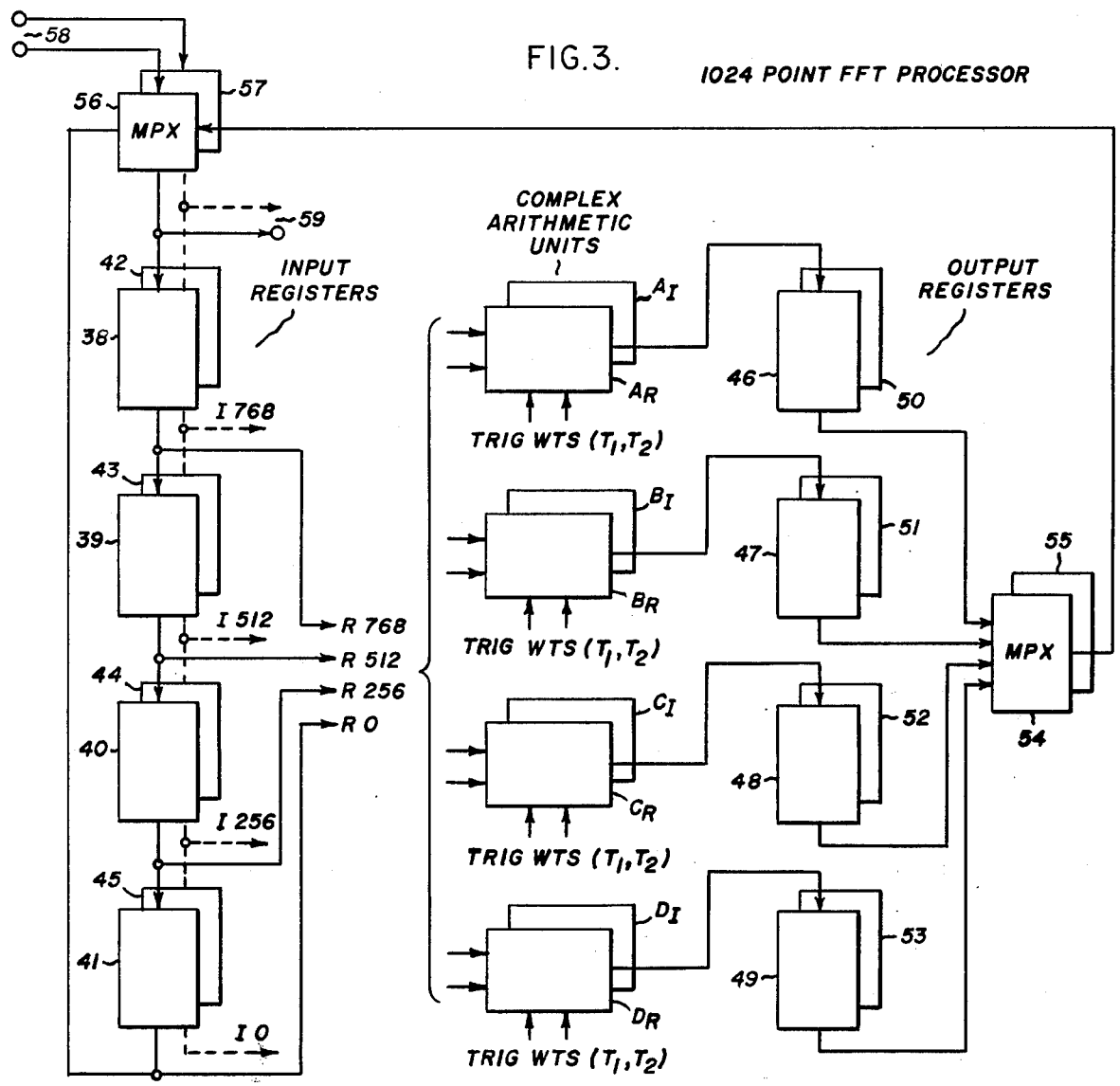
FIG.3. 1024 POINT FFT PROCESSOR
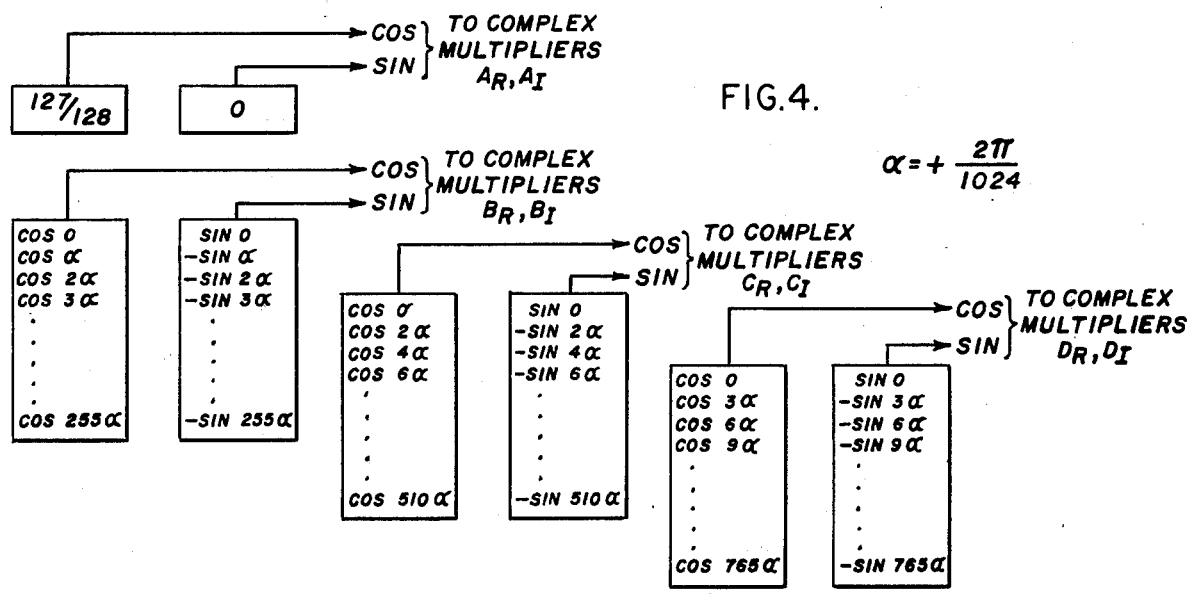
FIG.4.
$$\alpha = +\frac{2\pi}{1024}$$

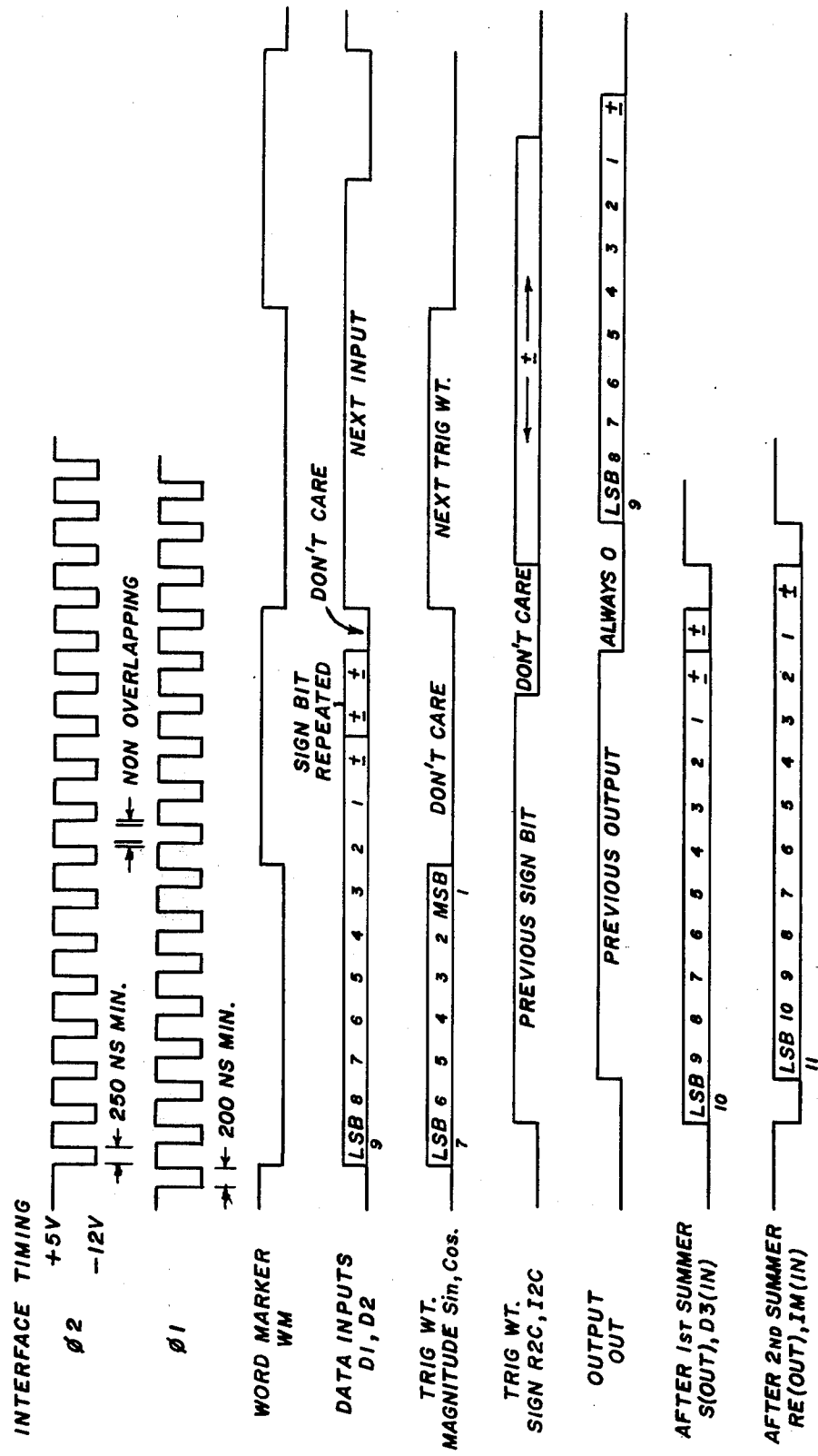

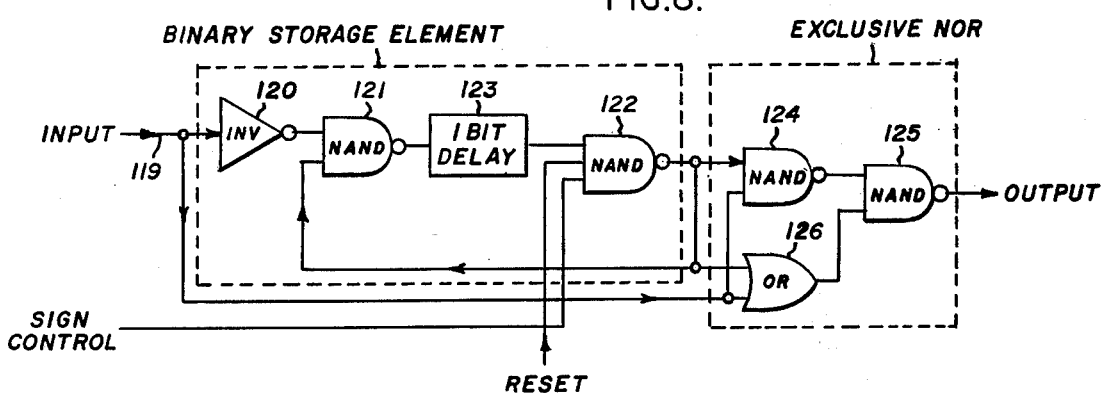
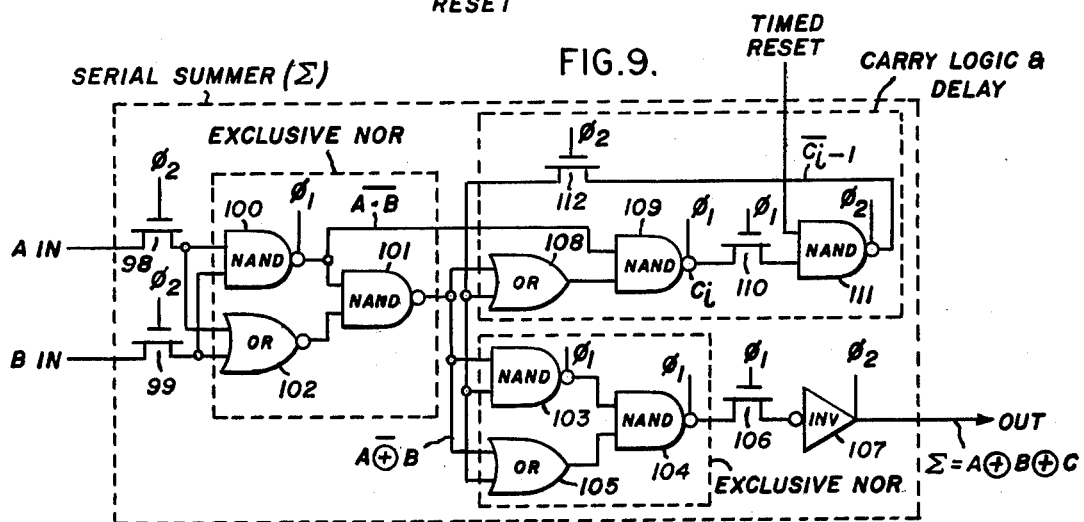
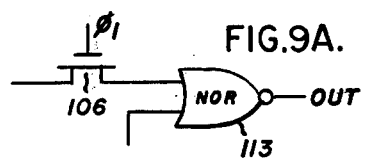
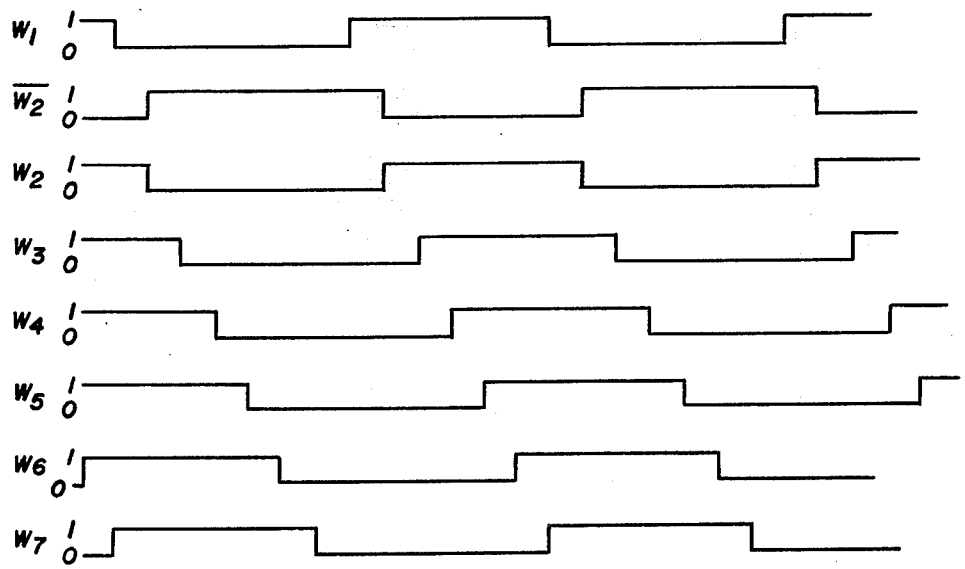

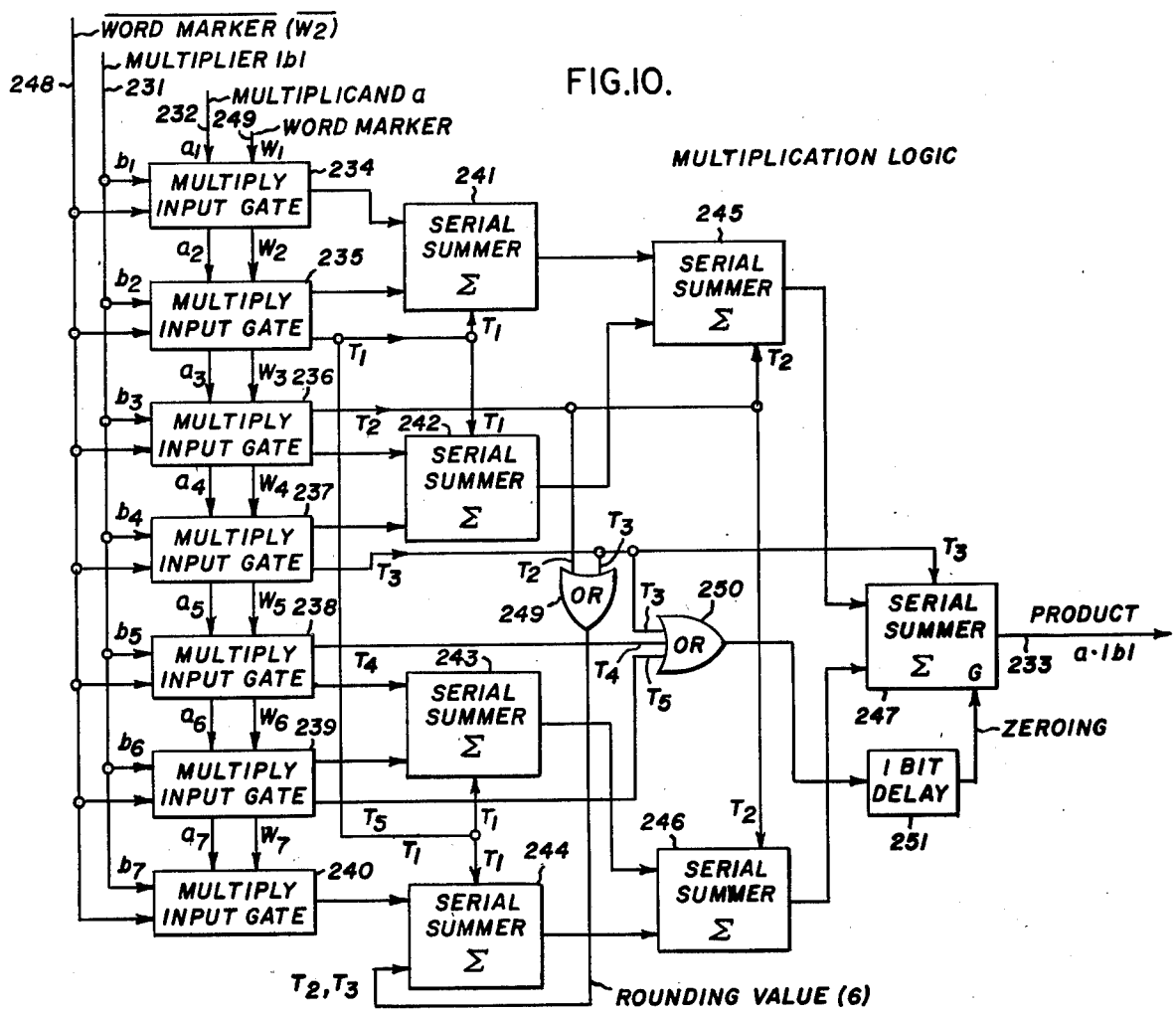

INTEGRATED ARITHMETIC UNIT FOR COMPUTING SUMMED INDEXED PRODUCTS

BACKGROUND OF THE INVENTION

1. Field of the Invention:

The present invention relates to an arithmetic unit for use in the field of computation and more particularly in the computation of summed indexed products. The indexed products may be matrix products or vector products of which the individual terms may be either real or complex (i.e., $a + jb$) quantities. The applications also include polynomial generation and inner product calculation. The arithmetic unit herein disclosed is particularly adapted for use in computing multiple point Fast Fourier Transforms (FFT) using several known families of algorithms.

The arithmetic unit is optimized for fabrication using large scale integration techniques wherein minimum external interconnections, maximum integration of function, minimum cost per function, and maximum flexibility of application are important considerations. (20)

2. Description of the Prior Art:

The invention is generally applicable to the computation of summed indexed products wherein the individual terms are complex quantities, as for instance in the computation of Fourier transformations. The discrete Fourier transform is defined as a summation of the products of successive uniformly distributed samples or "points" of a complex variable multiplied by a complex trigonometric function. The complex variable is normally time variant or spatially variant and the transform is the conversion from one domain to another, such as frequency or angle. The discrete Fourier transform is computed from a matrix of such products and is itself a column vector composed of successive Fourier coefficients computed at the sampling intervals or points. The Fast Fourier transform is defined as any of the forms of the Fourier matrix which are factorable due to symmetries, permitting recursions. These factorable forms typically employ permutations of the data combining operators, and multiplication involving diagonal matrix operators. A large number of algorithms are known for computing Fast Fourier Transforms and from these a selection may be made for maximum ease in hardward implementation.

All contemporary implementations of FFT transformers are likely to involve some degree of circuit integration but such use of integration has so far been far from optimum. The advent of integrated circuits (chips) has made it feasible to achieve ever larger amounts of computational capacity at ever lower incremental costs. Thus, whenever circuits performing individual logic functions and requiring a substantial number of active elements have been in large enough demand to pay the high initial costs of integration, they have been integrated. In this manner, integrated circuits for many common logic functions are now available and in any given equipment have displaced large numbers of discrete components. In a specific application requiring a substantial amount of computational capacity, as for instance, the computation of a 1024 point FFT transform with 10 bit precision in periods of a few milliseconds, all practical hardware embodiments have tended to involve a large amount of integrated circuitry. The integrated circuits "chips" have tended to small to medium scale integration, each performing a single, common logic function. Normally, such chips have been needed in quantities on the order of a hundred or two. When needed in such large quantities, medium scale integration (MSI) has tended to be only a short term solution because of the high cost of chip interconnections. Assuming a smaller number (typically one-tenth as many LSI chips) one would project that the total equipment costs would fall almost proportionately. In the case of FFT processors, the LSI solution has tended to stay uneconomic because of the difficulty of developing LSI chips, which when optimized for one specific FFT application, could also be applied to another FFT application. Thus, while large scale integration is potentially the most economic solution, an LSI chip capable of flexible FFT application has not hitherto been proposed.

With further reference to the FFT application, an arithmetic unit suitable for 1024 point transform with 10 bit precision, normally requires very substantial modification to compute a 256 point or a 4096 point transform. Similar modification is likely to be necessary when the precision or rate of computation is changed.

Some modes of paralleling have been suggested. One known approach is the "bit slice" philosophy of partitioning wherein several identical chips are used simultaneously during the computations upon a bit-parallel word format. However, this approach bears on parallelism upon the bits within a word, not parallelism upon words within the data array. Although nominally flexible in word length, carry propagation delay effects in fact limit the possible precision for a given clocking period.

SUMMARY OF THE INVENTION

Accordingly, it is an object of the present invention to provide an improved arithmetic unit capable of integrated circuit fabrication for use in computing summed indexed products.

It is a further object of the invention to provide an improved arithmetic unit adapted for use in FFT computation.

It is another object of the invention to provide an improved arithmetic unit for use in FFT computation, which is capable of integration, and which may be readily used in larger numbers to increase the rate of computation.

It is an additional object of the invention to provide an improved arithmetic unit for use in FFT computation, which may be integrated, and which may be flexibly applied to a processor having a variety of points, word lengths, or computational rates.

It is still another object of the invention to provide an improved arithmetic unit capable of integrated circuit fabrication for use in FFT computation which is adapted for serial input and serial output data.

It is still a further object of the invention to provide an improved arithmetic unit capable of integrated circuit fabrication for use in FFT computation which is adapted to perform vector multiplication and vector addition.

It is an additional object of the invention to provide an improved arithmetic unit capable of integrated circuit fabrication for use in FFT computation which is adapted to be used with other like units to perform vector multiplication and vector addition in a system wherein the data is applied to several units in bit serial, word parallel format.

It is a further object of the invention to provide a novel apparatus for FFT computation using the bit serial, word parallel organization.

It is another object of the invention to provide an improved arithmetic unit capable of integrated circuit fabrication for use in FFT computations which is adapted for use within either sequentially or randomly accessed memory, wherein economic benefits may accure from the typically lower cost and reduced interconnections of sequentially organized memory.

It is still another object of the invention to provide an improved unit for executing matrix processing operations.

It is an additional object of the invention to provide an improved unit to execute matrix operations, which is readily interconnected with like units by simple symmetric interconnections to achieve higher computational rates.

These and other objects of the invention are achieved in a novel arithmetic unit suitable for large scale integration comprising a vector adder and a vector multiplication logic. The vector adder is designed for bit serial, word serial binary data containing signed information and comprises a first sign changing means to which serial binary data is applied from a first data input terminal ($d_1$), and a first serial summer to which two serial binary data streams are applied respectively from the output of said first sign changing means and from a second data input terminal ($d_2$). The summer produces a first output quantity ($s_1$), where $$s_1 = (d_2 \pm d_1)$$

The vector adder further comprises a second sign changing means to which serial binary data is applied from the first summer and a second serial summer to which two serial binary data streams are applied respectively from the output of the second sign changing means and from the output of a third data input terminal ($d_3$). A second output quantity ($s_2$) appears at the output of the second summer, where $$s_2 = [d_3 \pm (d_2 \pm d_1)]$$

The vector multiplication logic is designed for bit serial, word serial binary data containing sign and magnitude information and comprises first multiplication means having a multiplicand input coupled to the output of the second serial summer and a multiplier input coupled to a fourth data input terminal ($t_1$), and second multiplication means having a multiplicand input coupled to a fifth data input terminal ($v_2$), and a multiplier input coupled to a sixth data input terminal ($t_2$). The vector multiplication logic further comprises a third sign changing means to which serial binary data is applied from the first multiplication means, a fourth sign changing means to which serial binary data is applied from the second multiplication means, and a third serial summer to which two serial binary data streams are applied respectively from the outputs of the third and fourth sign changing means.

The third serial summer produces a third output quantity (Z) which is the following function of the input quantities:

$$Z = \frac{1}{4} \left\{ \underset{f(c_4)}{\pm} t_2 \underset{f(c_3)}{\pm} t_1 \; [d_3 \underset{f(c_2)}{\pm} (d_2 \underset{f(c_1)}{\pm} d_1)] \right\}$$

wherein the sign selections are dependent on $c_4$, $c_3$, $c_2$ and $c_1$, respectively, More particularly, the vector adder accepts serial binary data inputs at the first ($d_1$), second ($d_2$) and third ($d_3$) data input terminals and produces serial binary data outputs in two's complement notation, least significant bit first in time and the sign bit last. The vector multiplication logic multiplies numbers in serial binary data format to obtain products in serial binary format with the multiplicand inputs of the first and second multiplication means accepting signed information in two's complement notation, least significant bit first in time and the sign bit last; while the multiplier inputs of the first and second multiplication means accept magnitude-only information. The products of the first and second multiplication means contain signed data in two's complement notation, least significant bit first in time and the sign bit last. Preferably, all the sign changing means are two's complementers.

In addition, the sign information associated with the multiplier input of the first multiplication means is applied to the control input ($c_3$) of the third sign changing means, and the sign information associated with the multiplier input of the second multiplication means is applied to the control input ($c_4$) of the fourth sign changing means, and the first and second multiplication produce single precision products and the multiplier, multiplicand and product bit streams occuring serially at equal word rates with the least significant bit first in time.

In accordance with another aspect of the invention, in which the computation of summed indexed products is undertaken, the indexed quantities include products of complex data and trigonometric data terms, the trigonometric data containing orthogonal elements, typically sines and cosines of the same angle. In addition, the elements of complex data are applied to the first ($d_1$), second ($d_2$), third ($d_3$) and fifth ($V_2$) data input terminals and the orthogonal trigonometric data is applied to the fourth ($t_1$) and sixth ($t_2$) data input terminals. Orthogonality in this application reduces the change in word length in the output of said third summer resulting from summation of elementary trigonometric products.

In one useful embodiment for computing summed index products a set of four arithmetic units ($A_r$, $A_i$, $C_r$, $C_i$) are interconnected as follows:

the $s_1$ output of $A_r$ ($s_{1Ar}$) is coupled to the $d_3$ input of $C_r$, and the $s_1$ output of $C_r$ ($C_{1Cr}$) is coupled to the $d_3$ input of $A_r$, the $s_1$ output of $A_i$ ($s_{1Ai}$) is coupled to the $d_3$ input of $C_i$, and the $s_1$ output of $C_i$ ($s_{1Ci}$) is coupled to the $d_3$ input of $A_i$, the $s_2$ output of $A_r$ ($s_{2Ar}$) is coupled to the $v_2$ input $A_i$, and the $s_2$ output of $A_i$ ($s_{2Ai}$) is coupled to the $v_2$ input of $A_r$, the $s_2$ output of $C_r$ ($s_{2Cr}$) is coupled to the $v_2$ input of $C_i$, and the $s_2$ output of $C_i$ ($s_{2Ci}$) is coupled to the $v_2$ input of $C_r$, so as to provide the overall function of:

$$\begin{bmatrix} z_{Ar} \\ z_{Ai} \\ z_{Cr} \\ z_{Ci} \end{bmatrix} = \begin{bmatrix} c_4 A_r\, t_{2Ar}\, v_{2Ar} + c_3 A_r\, t_{1Ar}\, {}^{d_3}A_r + c_2 A_r\, {}^{d_2}2A_r + c_1 A_r\, {}^{d_1}1A_r \\ c_4 A_i\, t_{2Ai}\, v_{2Ai} + c_3 A_i\, t_{1Ai}\, {}^{d_3}3A_i + c_2 A_i\, {}^{d_2}2A_i + c_1 A_i\, {}^{d_1}1A_i \\ c_4 C_r\, t_{2Cr}\, v_{2Cr} + c_3 C_r\, t_{1Cr}\, {}^{d_3}3C_r + c_2 C_r\, {}^{d_2}2C_r + c_1 C_r\, {}^{d_1}1C_r \\ c_4 C_i\, t_{2Ci}\, v_{2Ci} + c_3 C_i\, t_{1Ci}\, {}^{d_3}3C_i + c_2 C_i\, {}^{d_2}2C_i + c_1 C_i\, {}^{d_1}1C_i \end{bmatrix}$$

wherein $d_{1Ar}$, $d_{1Ai}$, $d_{1Cr}$; $d_{1Ci}$; $d_{2Ar}$, $d_{2Ai}$, $d_{2Cr}$, $d_{2Ci}$; $d_{3Ar}$, $d_{3Ai}$, $d_{3Cr}$, $d_{3Ci}$; $t_{1Ar}$, $t_{1Ai}$, $t_{1Cr}$, $t_{1Ci}$; $v_{1Ar}$, $v_{2Ai}$, $v_{2Cr}$, $v_{2Ci}$; $t_{2Ar}$, $t_{2Ai}$, $t_{2Cr}$, $t_{2Ci}$ denote the serial data inputs ($d_1$, $d_2$, $d_3$, $t_1$, $v_2$, $t_2$) of the subscripted arithmetic units ($A_r$, $A_i$, $C_r$, $C_i$), wherein $c_{1Ar}$, $c_{1Ai}$, $c_{1Cr}$, $c_{1Ci}$; $c_{2Ar}$, $c_{2Ai}$, $c_{2Cr}$, $c_{2Ci}$; $c_{3Ar}$, $3_{3Ai}$, $c_{3Cr}$, $c_{3Ci}$; $c_{4Ar}$, $c_{4Ai}$, $c_{4Cr}$, $c_{4Ci}$ denote the sign control settings ($c_1$, $c_2$, $c_3$, $c_4$) applied to the subscripted arithmetic units ($A_r$, $A_i$, $C_r$, $C_i$), and $z_{Ar}$, $z_{Ai}$, $z_{Cr}$, $z_{Ci}$ denote the (z) serial data outputs of the subscripted arithmetic units ($A_r$, $A_i$, $C_r$, $C_i$) as a function of the inputs and control settings.

In a similar manner two sets of four arithmetic units ($A_r$, $A_i$, $C_r$, $C_i$) and ($B_r$, $B_i$, $D_r$, $D_i$) may be interconnected so as to provide the overall function of:

$$\begin{bmatrix} z_{Ar} \\ z_{Ai} \\ z_{Br} \\ z_{Bi} \\ z_{Cr} \\ z_{Ci} \\ z_{Dr} \\ z_{Di} \end{bmatrix} = \begin{bmatrix} c_4 A_r\, t_{2A}\, v_{2Ar} + c_3 A_r\, t_{1A}\, {}^{d_3}3A_r + c_2 A_r\, {}^{d_2}2A_r + c_1 A_r\, {}^{d_1}1A \\ c_4 A_i\, t_{2A}\, v_{2Ai} + c_3 A_i\, t_{1A}\, {}^{d_3}3A_i + c_2 A_i\, {}^{d_2}2A_i + c_1 A_i\, {}^{d_1}1A_i \\ c_4 B_r\, t_{2B}\, v_{2Br} + c_3 B_r\, t_{1B}\, {}^{d_3}3B_r + c_2 B_r\, {}^{d_2}2B_r + c_1 B_r\, {}^{d_1}1B_r \\ c_4 B_i\, t_{2B}\, v_{2Bi} + c_3 B_i\, t_{1B}\, {}^{d_3}3B_i + c_2 B_i\, {}^{d_2}2B_i + c_1 B_i\, {}^{d_1}1B_i \\ c_4 C_r\, t_{2C}\, v_{2Cr} + c_3 C_r\, t_{1C}\, {}^{d_3}3C_r + c_2 C_r\, {}^{d_2}2C_r + c_1 C_r\, {}^{d_1}1C_r \\ c_4 C_i\, t_{2C}\, v_{2Ci} + c_3 C_i\, t_{1C}\, {}^{d_3}3C_i + c_2 C_i\, {}^{d_2}2C_i + c_1 C_i\, {}^{d_1}1C_i \\ c_4 D_r\, t_{2D}\, v_{2Dr} + c_3 D_r\, t_{1D}\, {}^{d_3}3D_r + c_2 D_r\, {}^{d_2}2D_r + c_1 D_r\, {}^{d_1}1D_r \\ c_4 D_i\, t_{2D}\, v_{2Di} + c_3 D_i\, t_{1D}\, {}^{d_3}3D_i + c_2 D_i\, {}^{d_2}2D_i + c_1 D_i\, {}^{d_1}1D_i \end{bmatrix}$$

In computation of the Fast Fourier Transform, the constants are sign control settings, assuming values of $+$ or $-1$:

$t_{1A}$, $t_{1B}$, $t_{1C}$, $t_{1D}$ are respectively the $\cos 0$, $\cos \alpha$, $\cos 2\alpha$, $\cos 3\alpha$, $t_{2A}$, $t_{2B}$, $t_{2C}$, $t_{2D}$ are respectively the $\sin 0$, $\sin \alpha$, $\sin 2\alpha$, $\sin 3\alpha$, so as to provide the overall function:

$$\begin{bmatrix} z_{Ar} \\ z_{Ai} \\ z_{Br} \\ z_{Bi} \\ z_{Cr} \\ z_{Ci} \\ z_{Dr} \\ z_{Di} \end{bmatrix} = \begin{bmatrix} \pm \sin 0\, v_{2Ar} \pm \cos 0\, {}^{d_3}3A_r \pm ({}^{d_2}2A_r \pm {}^{d_1}1A_i) \\ \pm \sin 0\, v_{2Ai} \pm \cos 0\, {}^{d_3}3A_i \pm {}^{d_2}2A_i \pm {}^{d_1}1A_i \\ \pm \sin \alpha\, v_{2Br} \pm \cos \alpha\, {}^{d_3}3B_r \pm {}^{d_2}2B_r \pm {}^{d_1}1B_r \\ \pm \sin \alpha\, v_{2Bi} \pm \cos \alpha\, {}^{d_3}3B_i \pm {}^{d_2}2B_i\, \delta\, {}^{d_1}1B_i \\ \pm \sin 2\alpha\, v_{2Cr} \pm \cos 2\alpha\, {}^{d_3}3C_r \pm {}^{d_2}2C_r \pm {}^{d_1}1C_r \\ \pm \sin 2\alpha\, v_{2Ci} \pm \cos 2\alpha\, {}^{d_3}3C_i \pm {}^{d_2}2C_i \pm {}^{d_1}1C_i \\ \pm \sin 3\alpha\, v_{2Dr} \pm \cos 3\alpha\, {}^{d_3}3D_r \pm {}^{d_2}2D_r \pm {}^{d_1}1D_r \\ \pm \sin 3\alpha\, v_{2Di} \pm \cos 3\alpha\, {}^{d_3}3D_i \pm {}^{d_2}2D_i \pm {}^{d_1}1D_i \end{bmatrix}$$

A stage of a matrix processor for complex data in accordance with the invention may comprise a first pair of serial input memories for real and imaginary input data, serial memory having a succession of evenly spaced taps for permuting the input data into an ideal shuffle; a plurality of vector adders each connected to at least two of said taps to produce real and imaginary, positive or negative outputs in accordance with the matrix $$\begin{bmatrix} 1 & 1 & 1 & 1 \\ 1 & j & -1 & -j \\ 1 & -1 & 1 & -1 \\ 1 & -j & -1 & j \end{bmatrix};$$

a like numbered plurality of vector multipliers, each multiplier in turn comprising a pair of multiplication means, each multiplication means having one input connected to one output of a vector adder and another input connected to a second source of complex data, the outputs of the two multiplication means in each vector multiplier being recombined into separate real and imaginary data, a second pair of serial output memories for serially ordering the real and imaginary processed data in accordance with the selected data permutation. When the processor is used for computation of the Fast Fourier Transform, the second source of complex data is a pair of real and imaginary inputs corresponding to stored trigonometric weights equal to cosine and sine functions of angles selected in accordance with the number of resolution points in the transform.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings, in which:

FIG. 3 is a block diagram of a 1024 point Fast Fourier Transform processor using eight arithmetic units;

FIG. 4 illustrates the trigonometric values made available to the individual arithmetic units for computing a 1024 point transform;

FIG. 7 is a timing chart illustrating the clocking, word marker and data timing of the FIG. 3 processor;

FIG. 8 is a logic diagram of the serial two's complementer (2) used in the arithmetic unit;

FIG. 9 is a logic diagram of a serial summer used in the arithmetic unit;

FIG. 9A represents a modification of the FIG. 9 serial summer.

FIG. 10 is a block diagram of the single precision multiplication logic used in the arithmetic unit;

FIG. 11 is a sequence chart illustrating the operation of the multiplication logic;

FIG. 12 illustrates the word marker waveforms useful in explaining the operation of the multiplication logic;

DESCRIPTION OF THE PREFERRED EMBODIMENT

Figure 1:
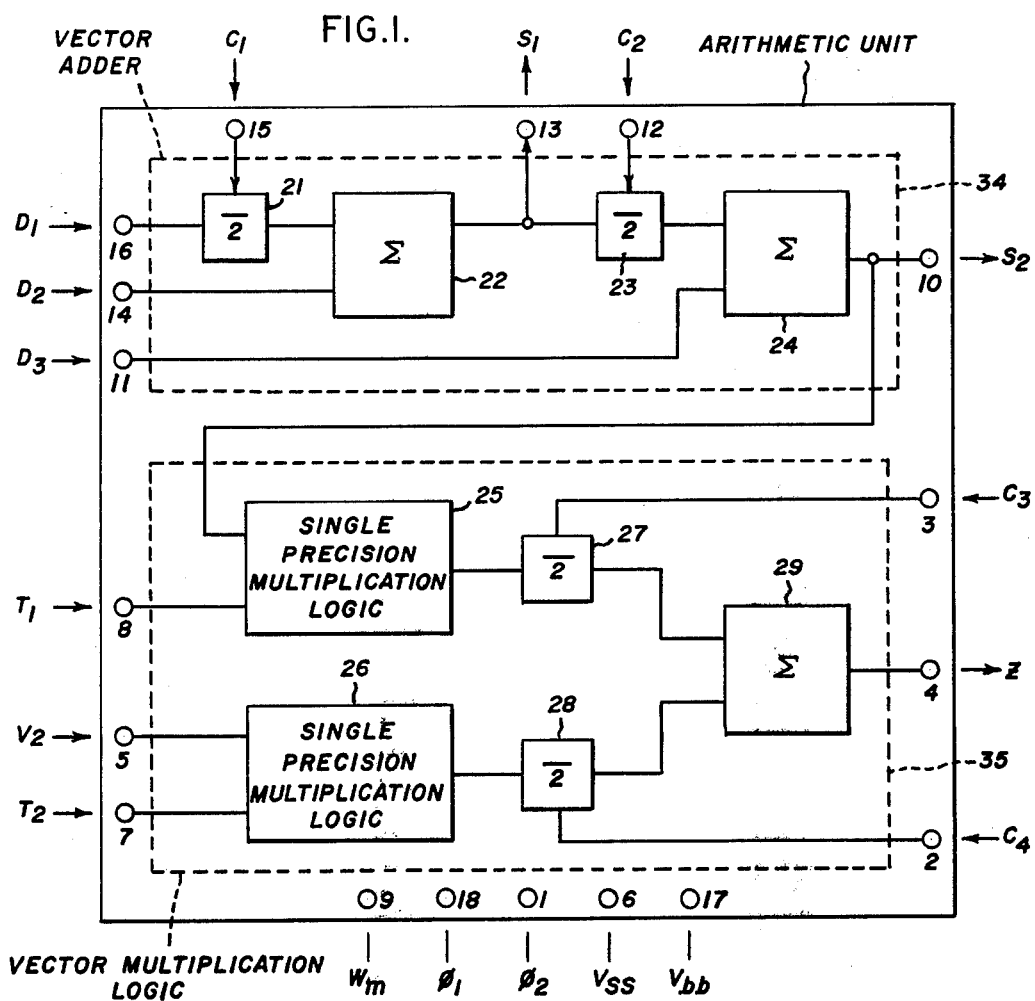
FIG. 1 is a block diagram of an arithmetic unit in accordance with the present invention formed as a single integrated circuit element and incorporating a vector adder and vector multiplication logic.

An arithmetic unit for performing summed indexed products and embodying the invention is illustrated in FIG. 1. The arithmetic unit is typically formed by large scale integration techniques on a single "monolithic" chip. The arithmetic unit is shown as a large rectangular block symbolizing the outline of the chip with external connections to pads distributed along its perimeter. A plurality of smaller blocks are shown within the large rectangular outline symbolizing the circuitry for performing the indicated logic functions. The chip is of silicon, using low-threshold silicon-gate MOS transistor technology. The integrated circuitry for performing the logic functions utilizes less than 400 gates with approximately 1330 transistors.

The arithmetic unit of FIG. 1 contains the logic elements 21 through 29. These may be subdivided into elements 21-24 performing vector addition, (the C function in the algorithm used for FFT computation) and the elements 25 through 29 performing vector multiplication (the E function in the FFT algorithm). The first group 21-24 making up the vector adder are located within dashed outline 34, and the second group 25-29 making up the vector multiplication logic are located within dashed outline 35. The arithmetic unit operates upon two sets of three data inputs ($d_1, d_2, d_3$), ($t_1, v_2, t_2$); requires four sign control settings $c_1, c_2, c_3$ and $c_4$; and produces two intermediate computed outputs ($s_1$ and $s_2$) and a final computed output ($z$). These, with data word length control, clocking and energization are the quantities generally noted on the pads arranged along the perimeter of the chip.

The arithmetic unit is designed for both input and output data in the serial format. In particular, each of the data inputs $d_1, d_2, d_3, t_1, v_2, t_2$ is designed for binary data in the bit serial word serial format. The data inputs $d_1, d_2, d_3$ and $v_2$ are designed for data in two's complement notation with the least significant bit first and the sign bit last, while the data inputs $t_1$ and $t_2$ are designed for magnitude only notation, also least significant bit first. The $t_1$ and $t_2$ inputs (which in the FFT application are used for stored trigonometric weights) are each associated with a sign bit applied to one of the control inputs ($c_3$ and $c_4$, respectively). The intermediate outputs $s_1$ and $s_2$ and the final output Z are in two's complement notation.

The first and second intermediate computed outputs ($s_1$ and $s_2$) of the arithmetic unit may be expressed as the following function of the inputs and sign control settings:

$$s_1 = (d_2 \underset{f(c_1)}{\pm} d_1) \quad (1)$$

$$s_2 = [d_3 \underset{f(c_2)}{\pm} (d_2 \underset{f(c_1)}{\pm} d_1)] \quad (2)$$

where $f(c_i)$; $i = 1, 2$ denotes the sign control settings.

The output ($z$) of the arithmetic unit may be expressed as the following function of the inputs and sign control settings:

$$z = \frac{1}{4}\left( \underset{(f(c_4)}{\pm} t_2 v_2 \underset{f(c_3)}{\pm} t_1 [d_3 \underset{f(c_2)}{\pm} (d_2 \underset{f(c_1)}{\pm} d_1)] \right) \quad (3)$$

the indicated sign selections being dependent respectively on $c_4, c_3, c_2$ and $c_1$.

The arithmetic unit either by itself or in combination with other arithmetic units is generally suited to the computation of indexed products:

$$\sum_{i=1}^{N} \sum_{j=1}^{M} a_i b_j; \quad (4)$$

the computation of the product of a matrix and a vector;

$$\bar{u} = D \bar{x}; \quad (5)$$

where
$\bar{u}$ is an m component column vector,
D is an $m \times n$ matrix, and
$\bar{x}$ is an n component column vector, the computation of the products of two matrices:

$$U = DC$$

where
U is a $k \times n$ matrix,
D is a $k \times m$ matrix, and
C is an $m \times n$ matrix
the computation of the products of a plurality of matrices and a vector; e.g., $$\bar{u} = DC\bar{x}$$

$$\begin{bmatrix} u_1 \\ u_2 \\ \cdot \\ \cdot \\ \cdot \\ u_n \end{bmatrix} = \begin{bmatrix} d_{11} & & & \\ & d_{22} & & \\ & & \cdot & \\ & & & d_{nn} \end{bmatrix} \begin{bmatrix} c_{11} & c_{12} & \cdots & c_{1n} \\ c_{21} & & & \\ \cdot & & & \\ c_{n1} & c_{n2} & \cdots & c_{nn} \end{bmatrix} \begin{bmatrix} x_1 \\ x_2 \\ \cdot \\ \cdot \\ x_n \end{bmatrix} \quad (7)$$

where D is a diagonal matrix, with non-zero values only on the diagonal.

More particularly, the invention is applicable to product computation, wherein each of the individual terms ($u_i, d_{ij}, c_{ij}, x_i$) of the operands in expressions (5), (6) or (7) are complex:

$$d_{ij} = a_{ij} + j b_{ij} ; a_{ij}, b_{ij} \text{ real numbers}$$

$c_{ij} = \pm 1 \pm j$ $x_i = y_i + j z_i$ ; $y_i, z_i$ real numbers

The arithmetic unit, normally in combination with other units, is particularly adapted to the computation of certain large families of "fast" Fourier transformations wherein the individual Fourier coefficients are expressed in exponential notation as:

$$F_k = \frac{1}{N} \sum_{s=0}^{N-1} x_s \exp\left(+\frac{j2\pi ks}{N}\right), 0 \quad k \quad N-1 \quad (8)$$

or re-expressed in trigonometric notation:

$$F_k = \frac{1}{N} \sum_{s=0}^{N-1} x_s \left(\cos \frac{2\pi}{N} ks + j \sin \frac{2\pi}{N} ks\right),$$

$$0 \quad k \quad (N-1) \quad (8')$$

$$x_s = [u_s + j v_s]$$

The multiple point transform $F_N$ may be expressed as follows:

$$F_n = T_N \bar{x} \quad (9)$$

where
$F_N$ = column vector $(F_0, F_1, \ldots, F_{N-1})$ Fourier coefficients
$T_N$ = the $N \times N$ matrix of complex eigenfunctions
$\bar{x}$ = column vector $(x_0, x_1, \ldots, x_{N-1})$ complex input data words.

The quantity 9 may be re-expressed in terms of $k$ and $s$ variables as the following product of a matrix (using exponential notation) and a column vector:

Fourier Coefficients $$\begin{bmatrix} F_0 \\ F_1 \\ \vdots \\ F_k \\ \vdots \\ F_{N-1} \end{bmatrix} = \begin{bmatrix} e^{j\frac{2\pi}{N} \cdot 0 \cdot 0} & e^{j\frac{2\pi}{N} 0 \cdot 1} & \ldots e^{j\frac{2\pi}{N} 0 \cdot s} & \ldots e^{j\frac{2\pi}{N} 0 \cdot (N-1)} \\ \ldots & \ldots & \ldots & \ldots \\ e^{j\frac{2\pi}{N} k \cdot 0} & e^{j\frac{2\pi}{N} k \cdot 1} & \ldots e^{j\frac{2\pi}{N} k \cdot s} & \ldots e^{j\frac{2\pi}{N} k(N-1)} \\ \ldots & \ldots & & \ldots \\ e^{j\frac{2\pi}{N} (N-1) \cdot 0} & e^{j\frac{2\pi}{N} (N-1)1} & \ldots & \ldots e^{j\frac{2\pi}{N} (N-1)(N-1)} \end{bmatrix} \begin{bmatrix} x_0 \\ x_1 \\ x_2 \\ \vdots \\ x_{(N-1)} \end{bmatrix} \quad (10)$$

where
$F_k$ are the Fourier Coefficients
$k$ is the row
$s$ is the column
$F = g_k + jH_k$ The preceding matrix may also be expressed as a function of cosine and sine functions.

The multiple point transform $(T_N)$ may be computed by an algorithm of the following general form:

$$T_N = Q_N \prod_{i=1}^{\pi} (E_i C P) \quad (9)$$

where
$\pi$ denotes the indexed products of the bracketed terms, $N = r^n$
$E_i$ = diagonal matrix of trigonometric weights,
$P_k^r$ = ideal-shuffle permutation matrix
$r$ = radix of the shuffle, i.e., the number of subsequences into which the input data column vector is divided
$Q_N$ = digit reversal permutation matrix
$C = T'_k \times I_{n/k}$ direct product matrix
$I_{N/k}$ = identity matrix of dimension N/k $$T'_k = \begin{bmatrix} 1 & 1 & 1 & 1 \\ 1 & j & -1 & -j \\ 1 & -1 & 1 & -1 \\ 1 & -j & -1 & j \end{bmatrix} \text{ for } k = 4$$

The algorithm may take the following more specific form, assuming a 1024 point transform and the radix four operation.

$$T_{1024} = Q_N [E_5 CP] [E_4 CP] [E_3 CP] [E_2 CP] [E_1 CP] \quad (12)$$

where
$P$ denotes an ideal shuffle permutation alike in each bracketed step of the calculation,
$E_i$ denotes a multiplication operation peculiar to each bracketed step of the calculation, and
$C$ denotes a combining operation alike in each bracketed step.

For the purpose of further specific hardware definition $T_{1024}$ may take the following alternative form (which can be drived from (12)):

$$T_{1024} = \begin{bmatrix} [(I_{256} \times P_4)] & (I_{256} \times D_4) & (I_{256} \times T_4')] \\ [(I_{64} \times P_{16})] & (I_{64} \times D_{16}) & (I_{256} \times T_4')] \\ [(I_{16} \times P_{64})] & (I_{16} \times D_{64}) & (I_{256} \times T_4')] \\ [(I_4 \times P_{256})] & (I_4 \times D_{256}) & (I_{256} \times T_4')] \\ [(I_1 \times P_{1024})] & (I_1 \times D_{1024}) & (I_{256} \times T_4')] \\ \text{(Permutation)} & \text{(Multiplication)} & \text{(Combination)} \end{bmatrix} \quad (13)$$

where the following notation has been used for N = 1024.
$I_n = n \times n$ identity matrix consisting of ones along the diagonal, zeroes elsewhere
$D_{N/k}$ = quasidiagonal matrix $(I_{N/4k}, K_k, K_{2k}, K_{3k})$ (a quasidiagonal matrix consists of matrices along the diagonal and zeroes elsewhere)
$K_m$ = diagonal $(W^0, W^m, W^{2m}, \ldots W^{(N/4k)-1) m}$
$k = 4^i$ $(i = 0, 1, \ldots, 4)$
$W = e^{j 2\pi /N}$
$P_k^{(r)}$ is a permutation matrix defined in terms of its effect on a K element column vector X;

$$P_k(r) \text{ col } (X_o, \ldots, X_{k-1}) = \text{col } (X_o, X_p, X_{2p}, \ldots, X_{r-1)p},$$
$$X_1, X_{p+1}, \ldots X_{k-1}) \quad (14)$$

where $r$ = radix of the shuffle, i.e., the number of subsequences into which the K element column vector is divided ($k = r^n$ for some integer $n$); and $p = k/r$, the number of elements in each subsequence.

The result of permuting a column vector in this manner may be seen in a simple example, the radix 4 ideal shuffle of a 16 element column vector $(X_0, X_1, X_2, X_3, X_4, X_5, \ldots X_{15})$ by the permutation matrix $P_{16}{}^{(4)}$ follows:

$$\begin{pmatrix} 1000000000000000 \\ 0000100000000000 \\ 0000000010000000 \\ 0000000000001000 \\ 0100000000000000 \\ 0000010000000000 \\ 0000000001000000 \\ 0000000000000100 \\ 0010000000000000 \\ 0000001000000000 \\ 0000000000100000 \\ 0000000000000010 \\ 0001000000000000 \\ 0000000100000000 \\ 0000000000010000 \\ 0000000000000001 \end{pmatrix} \times \begin{pmatrix} X_0 \\ X_1 \\ X_2 \\ X_3 \\ X_4 \\ X_5 \\ X_6 \\ X_7 \\ X_8 \\ X_9 \\ X_{10} \\ X_{11} \\ X_{12} \\ X_{13} \\ X_{14} \\ X_{15} \end{pmatrix} = \begin{pmatrix} X_0 \\ X_4 \\ X_8 \\ X_{12} \\ X_1 \\ X_5 \\ X_9 \\ X_{13} \\ X_2 \\ X_6 \\ X_{10} \\ X_{14} \\ X_3 \\ X_7 \\ X_{11} \\ X_{15} \end{pmatrix} \begin{matrix} \text{1st} \\ \text{Sub-} \\ \text{sequence} \\ \\ \text{2nd} \\ \text{Sub-} \\ \text{sequence} \\ \\ \text{3rd} \\ \text{Sub-} \\ \text{sequence} \\ \\ \text{4th} \\ \text{Sub-} \\ \text{sequence} \end{matrix} \quad (15)$$

The radix four ideal shuffle permutation permits simultaneous processing of the data flows in four or more paralleled paths. A radix two or radix eight permutation is also practical, but when applied to a large (i.e. 1024 point) transform, less convenient in implementation. With radix four, the C operation may be implemented without multiplication.

Figure 2:
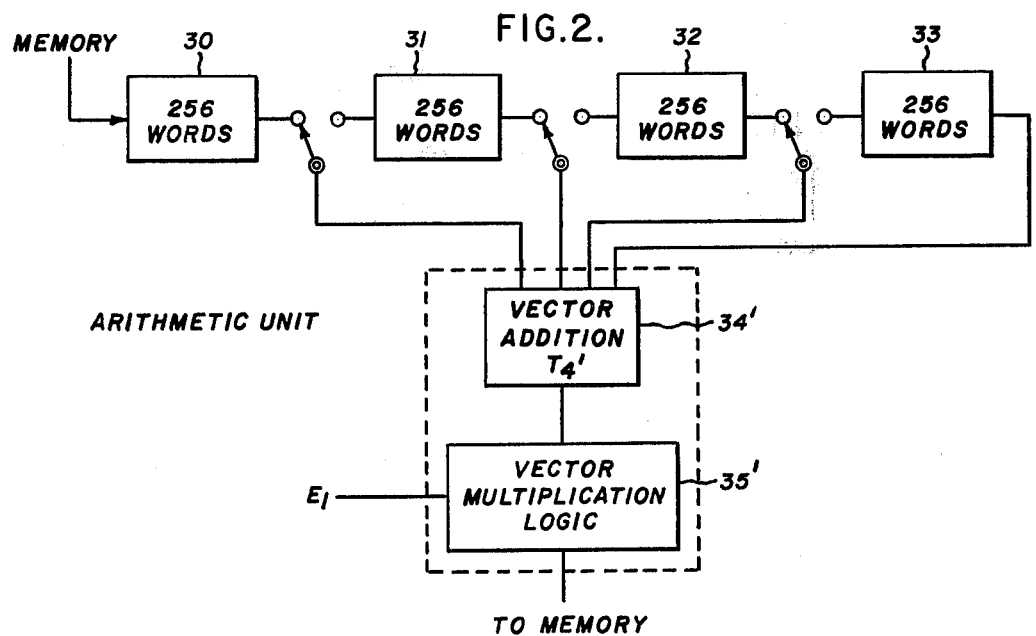
FIG. 2 is a simplified block diagram of a stage of a Fast Fourier Transform processor employing one or more arithmetic units.

The algorithm (expression 13) suggests a repetitive use of the logic configuration performing the P C E operation shown in FIG. 2. That logic configuration comprises an input memory into which the data vector ($\overline{X}$, normally a complex quantity) is introduced. The input memory for the real or imaginary parts of the data vector consists of two sets of four 256 word shift register sections (30, 31, 32, 33) (of which only one set of four is shown). At the end of each register section, taps corresponding 256, 512, 768 and 1024 word delays are present. The tapped serial input memory permits an ideal shuffle for the P operation. The taps are coupled to the addition block 34', which consists typically of the vector adder 34 of several arithmetic units.

In block 34' of FIG. 2, the C operation, a signed complex addition takes place. In this algorithm (expression 13), it is the same for each C term of the algorithm:

$$C = I_{256} \times T_4' \quad (16)$$

The output of the addition block 34' is then coupled to the multiplication logic 35' which may consist typically of the vector multiplication logics 35 of one, two or four arithmetic units into which the diagonal coefficient matrix ($E_i$) (corresponding to the trigonometric weights in the FFT computation) is introduced. Here also the operands are both signed and have real and imaginary parts. The diagonal coefficient matrix ($E_i$) is different for each line of the algorithm and takes the following forms:

$$(I_{256} \times D_4); (I_{64} \times D_{16}); (I_{16} \times D_{64}); (I_4 \times D_{256}); (I_1 \times D_{1024}) \quad (17)$$

The product produced within the multiplication logic 35' is then transferred to an output memory which may be used either to reintroduce the output back through the same arithmetic components again or to a succeeding stage in which an identical set of similar arithmetic components are present. The arithmetic unit, or combinations of arithmetic units, perform the C and the E functions, while the P function is normally implemented by steering of the serial input and/or output memories.

A practical processor for performing 1024 point transform using the foregoing algorithm is more completely illustrated in a simplified block diagram in FIG. 3. As discussed in connection with FIG. 3, the input and output shift registers and multiplexers perform the P operation (which takes the form of the ideal shuffle), and eight arithmetic units perform the C and E operations. The C operation is performed by the vector adders working in two sets of four units (hereinafter referred to as units $A_R$, $B_R$, $C_R$, $D_R$ and $A_I$, $B_I$, $C_I$, $D_I$) to produce real and imaginary operands applied to the complex multipliers. The interconnections for the C operation are illustrated in detail in FIG. 5. The E operation is complex multiplication performed by the vector multiplication logics acting in four sets of two units (as will be explained) to produce the real (R cos − I sin) and the imaginary (R sin + I cos) product terms. The interconnections for the E operation are illustrated in detail in FIG. 6.

The processor of FIG. 3 is designed to accept serial data at the input terminals 58 and to produce the fast Fourier transformation at the output terminals 59. The processor comprises a pair of input multiplexers (56, 57), a pair of output multiplexers (54, 55), two sets of four tap input shift registers (38-41; 42-45), respectively, for the real and imaginary inputs. The processor further comprises the eight arithmetic units ($A_R$, $B_R$ $C_R$ $D_R$; $A_I$ $B_I$, $C_I$, $D_I$ noted above) and two sets of four output registers (46-49, 50-53) each serially coupled between the arithmetic units and the output multiplexers (54, 55).

The data flows within the 1024 point FFT processor are illustrated in a simplified manner in FIG. 3. The multiplexed serial input data from 56, 57 segregated into real and imaginary data streams are applied respectively to a succession of four 256 word "real" input shift registers (38–41) and into a second succession of four "imaginary" input shift registers (42–45). Outputs from real output registers (46–49) and imaginary output registers (50–53) (whose other connections will be specified below) are also introduced into the input multiplexers 56, 57, respectively, via multiplexers 54 and 55.

The input shift registers for the real and imaginary input data are each provided with four taps at storage locations 768, 512, 256, and 0 words (10 bits/word). These taps are applied in a manner not fully shown in FIG. 2, to the D1, D2 inputs of the vector adders of the eight arithmetic units, while the $D_3$ inputs of each unit are derived from an $S_1$ output of another arithmetic unit within the group. The interconnections of the vector adder are detailed in FIG. 5. The complex trigonometric data $t_1$, $t_2$, also called trig weights, are applied to the vector multipliers of the arithmetic units from stored tables as shown in FIG. 4, while the $V_2$ inputs of each unit are derived from an $S_2$ output of another arithmetic unit within the group. These interconnections ($V_2 - S_2$) are detailed in FIG. 6. The Z output of each arithmetic unit separated into real and imaginary components is then coupled through the output shift registers (46–53) each serially arranged at the output of an arithmetic unit. The real data streams derived from the four real output shift registers (46–49) are then introduced into the four to one real output multiplex unit 54. The imaginary data streams derived from the four imaginary shift registers (50–53) are coupled to the four to one imaginary output multiplex unit 55. The outputs of the real and imaginary multiplex output units 54, 55 are fed back as already noted to the input multiplexers (56, 57) where they are available with input data and recirculated data. The complex 1024 point Fourier transformed data is available from the multiplex units (56, 57) at the serial output points 59.

Figure 5:
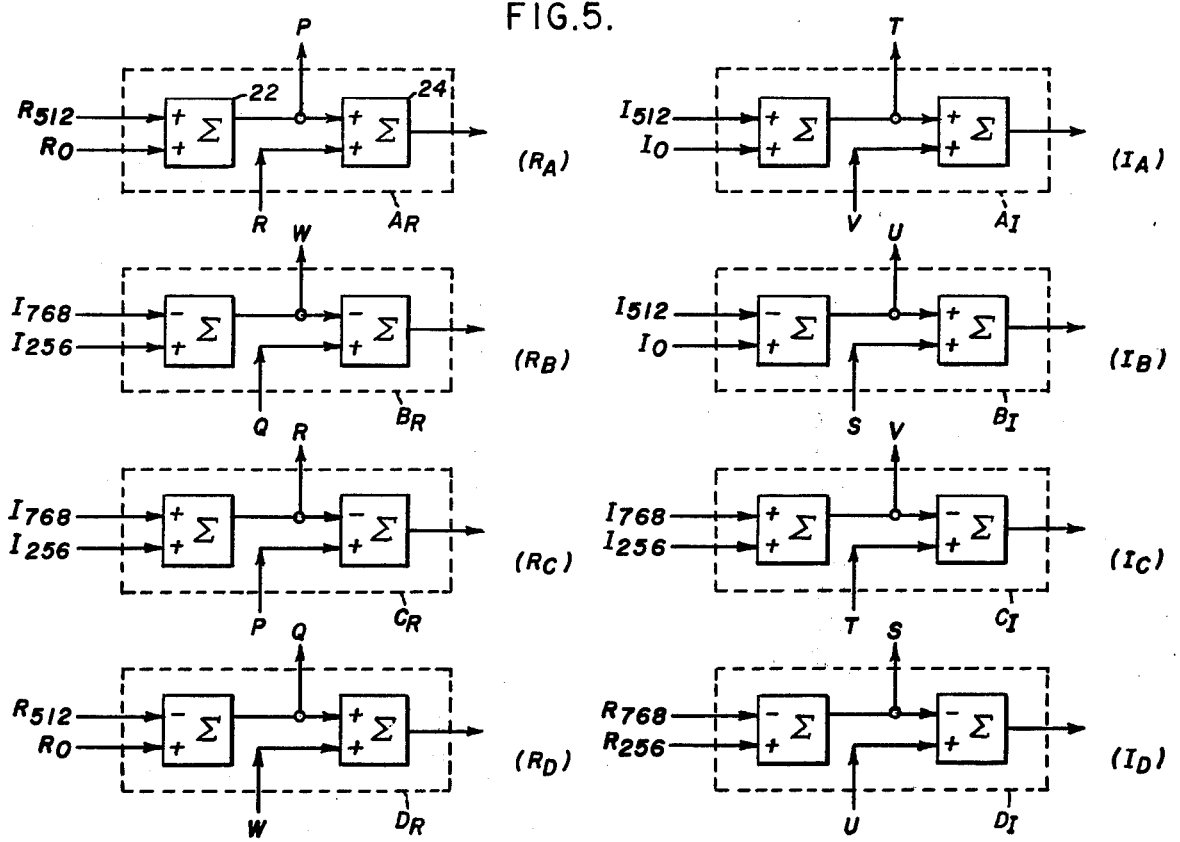
FIG. 5 is an interconnection diagram of the vector adders of eight arithmetic units in the 1024 point Fast Fourier Transform processor of FIG. 3.

A more detailed understanding of the C operation may be gathered from a consideration of FIG. 5. FIG. 5 shows the 16 summers (22, 24 — FIG. 1) for the real arithmetic units denoted $A_R$, $B_R$, $C_R$, $D_R$, which produce real outputs and the summers for the four imaginary arithmetic units denoted $A_I$, $B_I$, $C_I$, $D_I$ producing imaginary outputs. The sign settings effected by controls $C_1$ and $C_2$ acting on the two's complementers (21, 23 — FIG. 1, respectively) are noted in the blocks of the individual summers (22, 24 — FIG. 1). As seen in FIG. 5, the first summer 22 in arithmetic unit $A_R$ has its input connected to the real input shift register taps $R_{512}$ and $R_0$. Since both input sign controls are set positive, the first summer in $A_R$ produces a first intermediate output ($S_1$) defined as P:

$$P = R_0 + R_{512} \text{ [from } A_R] \tag{18}$$

The first summer 22 in the arithmetic unit $A_I$ has its inputs connected to the corresponding imaginary input shift register taps $I_0$ and $I_{512}$. Since its sign control settings are both positive, it produces a first intermediate output ($S_1$) defined as T:

$$T = I_0 + I_{512} \text{ [from } A_I] \tag{19}$$

Similarly, the remaining real and imaginary arithmetic units provide the first intermediate ($S_1$) outputs as follows:

$$Q = R_0 - R_{512} \text{ [from } D_R]$$

$$R = R_{256} + R_{768} \text{ [from } C_R]$$

$$S = R_{256} - R_{768} \text{ [from } D_I] \tag{20}$$

$$U = I_0 - I_{512} \text{ [from } B_I]$$

$$V = I_{256} + I_{768} \text{ [from } C_I]$$

$$W = I_{256} - I_{768} \text{ [from } B_R]$$

These first summed ($S_1$) quantities denoted (P to W) are then resummed in the second summers (24 — FIG. 1) of each arithmetic unit in accordance with the sign control settings noted in FIG. 5. Denoting the real $S_2$ outputs of the second summers respectively as $R_A$, $R_B$, $R_C$, $R_D$ and the imaginary $S_2$ outputs as $I_A$, $I_B$, $I_C$, $I_D$, the second summed quantities have the following values in terms of the first summed quantities:

$$R_A = P + R$$
$$R_B = Q - W$$
$$R_C = P - R$$
$$R_D = Q + W \tag{21}$$
$$I_A = T + V$$
$$I_B = U + S$$
$$I_C = T - V$$
$$I_D = U - S$$

In terms of the input data derived from the input shift registers, the second summed quantities ($S_2$) produced in the arithmetic units have the following values:

$$R_A = R_0 + R_{256} + R_{512} + R_{768}$$
$$I_A = I_0 + I_{256} + I_{512} + I_{768}$$
$$R_B = R_0 - R_{256} - R_{512} + R_{768}$$
$$I_B = I_0 + R_{256} - I_{512} - R_{768} \tag{22}$$
$$R_C = R_0 - R_{256} + R_{512} - R_{768}$$
$$I_C = I_0 - I_{256} + I_{512} - I_{768}$$
$$R_D = R_0 + I_{256} - R_{512} - I_{768}$$
$$I_D = I_0 - R_{256} - I_{512} + R_{768}$$

By visual inspection, expression (22) is seen to be no more than the combination operation:

$$(I_{256} \times T_4') \tag{14}$$

where $T_4'$ is as defined in expression (11).

In performing the C operation, the arithmetic units $A_R$ and $C_R$ interchange R and P outputs, and the $B_R$ and $D_R$ interchange Q and W outputs. Together, the vector adders of units $A_R$, $B_R$, $C_R$ and $D_R$ produce the real operands applied to the input of the vector multipliers. Thus, these four units may be regarded as operating as a set of four. The arithmetic units $A_I$, $B_I$, $C_I$ and $D_I$ are similarly interconnected and act as a second set of four units to produce the imaginary operands applied to the input of the vector multipliers. A second effect of the interchange of summed products is to implement the above C operation with a total of 16 adders rather than 24 that would have been required had the terms of each expression been directly summed in a conventional two tiered summation tree.

While the C operation outlined above is the same in each stage of the algorithm (expression 13), the E operation (i.e., the vector multiplication) is different (see expression 17). The E operation can best be understood by reference to FIGS. 3, 4 and 6.

Viewed as a whole, the E operation consists of taking Kronecker products of the form $$(I_m \times D_n) \tag{23}$$

where
$m\ n = 1024$,
$I_m$ is an $m \times m$ identity matrix, and
$D_n$ is an $n \times n$ diagonal matrix having trigonometric values which are complex functions of the arbitrary angle $\theta$. Theta is normally expressed in terms of the sampling angle $\alpha$ or a multiple, where $\alpha = (2\pi/N)$, or $(2\pi/1024)$ radians when $N = 1024$. The product may be seen to be no more than a diagonal matrix of 1024 $\times$ 1024 elements. This product may also be regarded as a vector of 1024 elements.

Each term of the product involves a multiplication of a complex number by a complex number defined by a pair of trigonometric weights:

$$(R + jI)(\cos\theta + j\sin\theta) = (R\cos\theta - \sin\theta) + j(R\cos\theta - I\sin\theta) \tag{25}$$

Figure 6:
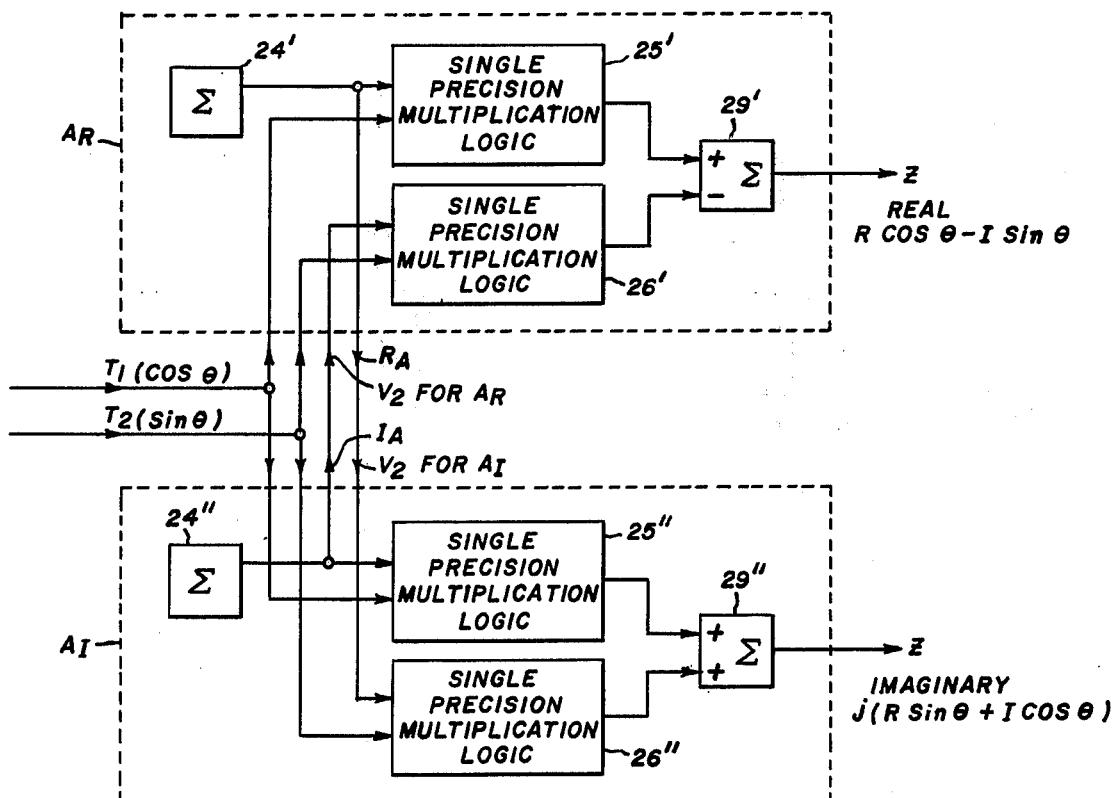
FIG. 6 is an interconnection diagram of the vector multiplication logics of two arithmetic units in the 1024 point FFT processor of FIG. 3.

The E operation separately treats the real and imaginary components of each of the two operands. The E operation requires four multiplications and the summation of the products of the real multiplications and the summation of the products of the imaginary multiplications. The implementation of expression (25) is indicated in FIG. 6. For simplicity, the interconnections of only the first two arithmetic units ($A_R$, $A_I$) of FIG. 3 have been indicated in FIG. 6, and only those interconnections significant to performing the E operation have been shown.

In FIG. 6, the last summer 24' in the vector adder on the arithmetic unit $A_R$ is shown having its real output ($S_2$; $R_4$) coupled to the first input of the single precision multiplication logic 25' on the same chip. The other input to the mutliplication logic 25 is the quantity $T_1$, the trigonometric weight which is a positive cosine $\theta$ quantity. The output of the multiplication logic 25' is shown coupled to a first input of the summer 29'. The summer 29' has a plus sign indicated at the point of the input connection. A second single precision multiplication logic 26' is also provided on the chip $A_R$. Both of its inputs $V_2$ and $T_2$ are derived from off the chip. The $T_2$ input quantity to 26' is a sine $\theta$ function. The output of 26' is connected to a second input of the summer 29' and it is negated as shown in the drawing by a two's complementer 28' not shown in FIG. 6. The output of the serial summer 29' is the real output quantity:

$$R\cos\theta - I\sin\theta \tag{26}$$

The second arithmetic unit $A_I$ is shown in FIG. 6 with elements 24", 25" and 29" identical to those in unit $A_R$. The $S_2$ output of summer 24" is an imaginary quantity and it is directly coupled to the multiplication logic 25" on the same chip and to the $V_2$ input of the chip $A_R$ (i.e., the first input of the multiplication logic 26'). The second input to the multiplication logic 25" is a cosine $\theta$ quantity, equal to that applied to logic 25' on the other chip. The multiplication 26" derives its first input from the $S_2$ output of the $A_R$ unit, and its second input is a sin $\theta$ quantity equal to that applied to the second input of 26'. The outputs of 25" and 26" are summed without negation in summer 29" and produce the imaginary quantity:

$$j(R\sin\theta + I\cos\theta) \tag{27}$$

Returning to a consideration of FIG. 3, the E operation, as suggested by expression (25), produces one real and one imaginary component for each complex product corresponding to each trigonometric weight. The real part of the summed products of four arithmetic units, one in each pair of units, are combined to provide a single real output. Similarly, the summed products of four arithmetic units, the other one in each pair of units, are combined to provide a single imaginary output. In the vector multiplication operation, each pair of chips: ($A_R$, $A_I$), ($B_R$, $B_I$), ($C_R$, $C_I$) ($D_R$, $D_I$) selects a different sequence of trigonometric weights. In addition, in each successive stage of the multiplication operation, a different usage of the trigonometric weights is made. This will now be explained with further reference to FIG. 4.

The trigonometric weights applied to the multiplication logic are taken from stored trigonometric tables and have the values selected from those generally indicated in FIG. 4. In particular, the multipliers of the first pair ($A_R$, $A_I$) of arithmetic units obtain a cosine and sine value corresponding to an angle $\theta$ of exactly zero. (The cosine value is quantized in factional form as 127/128.) Using this value, 256 complex product terms are formed. The multipliers of the second pair ($B_R$, $B_I$) accept cosine and negative sine values for 256 angles which assume consecutive integral values of $\alpha$, ranging from 0 to $255\alpha$, where $\alpha = (2\pi/N)$, i.e., $(2\pi/1024)$, radians and produce 256 additional complex products. The complex multipliers of the third pair ($C_R$, $C_I$) accept cosine and negative sine values for 256 angles, which assume double ($2\alpha$) integral values of $\alpha$ ranging from 0 to $510\alpha$ and produce a third set of 256 complex products. The multipliers of the fourth pair ($D_R$, $D_I$) of arithmetic units accept cosine and negative sine values for 256 angles which assume triple ($3\alpha$) integral values ranging from 0 to 275 and product a fourth set of 256 complex products. The four sets of product terms thus amount to a total of 1024 terms for each E operation in the manner implied by expression (24).

As noted above, the E operation is repeated once in each line of the algorithm (13) and in each repetition a different use is made of the trigonometric weights. The input data flows need not change nor need any other change be made in the equipment required to implement the different E operations. The different use is that in the first E operation, each of the above enumerated trigonometric weights is used once while in the second, third, fourth and fifth stages successively fewer trigonometric weights are selected, but each weight is used successively larger numbers of times. In each stage, the operation produces a column vector having 1024 consecutive complex terms.

In the first stage of operation the matrix product $I_1 \times D_{1024}$ is produced.

$$D_{1024} = \text{quasidiagonal } K_0, K_1, K_2, K_3$$

$K_0$ = diagonal (0, 0, 0 ... )

$K_1$ = diagonal (0, 1, 2, 3, ... 255)

$K_2$ = diagonal (0, 2, 4, 6, ... 510)

$K_3$ = diagonal (0, 3, 6, 9, ... 765)

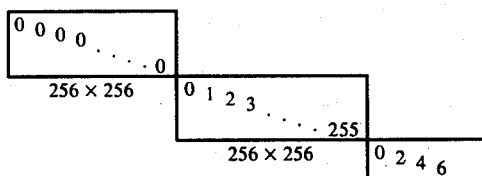

(28)

wherein the individual terms of the product matrix have the following values in terms of W:

$$W^0$$
$$\vdots$$
$$W^3 = e^{\left(-j\frac{2\pi}{1024}\right)(3)} = \cos\left[\left(\frac{2\pi}{1024}\right)(3)\right] + j\sin\left[\left(\frac{2\pi}{1024}\right)(3)\right] \quad (29)$$
$$\vdots$$
$$W^n = e^{\left(-j\frac{2\pi}{1024}\right)^n} = \cos\left[\left(\frac{2\pi}{1024}\right)(n)\right] + j\sin\left[\left(\frac{2\pi}{1024}\right)(n)\right]$$

where $n$ is an indexing number.

The D matrix used in forming the second matrix product is a quasidiagonal matrix of the following form:

$D_{256} = K_0, K_4, K_8, K_{12}$ $K$ = diagonal (0, 0, 0, ... )

$K_4$ = diagonal (0, 4, 8, 16, ... 252)

$K_8$ = diagonal (0, 8, 16, ... 504)

$K_{12}$ = diagonal (0, 12, 24, ... 756)

The second matrix product $I_4 \times D_{256}$ may be symbolized as a second column vector having 1024 terms:

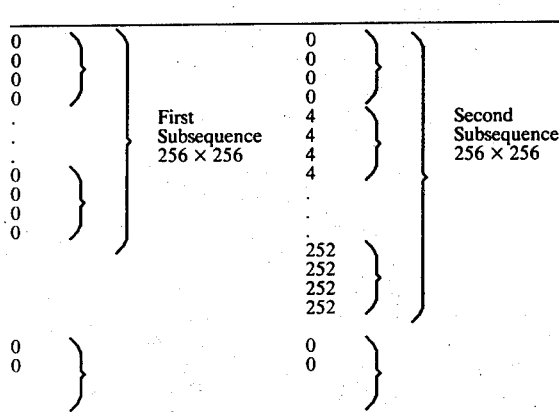

The $D_{64}$ matrix, used in forming the third matrix product is of the following form:

$D_{64}$ = quasidiag ($K_0, K_{16}, K_{32}, K_{48}$)

$K_0$ = diagonal (0, 0, 0, ... )

$K_{16}$ = diagonal (0, 16, 32 ... 240)

$K_{32}$ = diagonal (0, 32, 64, ... 480)

$K_{48}$ = diagonal (0, 48, 96, ... 720)

The product $I_{16} \times D_{64}$ is similar to the prior one ($I_4 \times D_{256}$) except each element listed above repeats 16 times.

The $D_{16}$ matrix, used in forming the fourth matrix product is of the following form:

$D_{16}$ = quasidiag ($K_0, K_{64}, K_{128}, K_{192}$)

$K_0$ = diagonal (0, 0, 0 ... )

$K_{64}$ = diagonal (0, 64, 128, 192)

$K_{128}$ = diagonal (0, 128, 256, 384)

$K_{192}$ = diagonal (0, 192, 384, 576)

The product $I_{64} \times D_{16}$ consists of the above elements each repeated 64 times.

The $D_4$ matrix used in forming the fifth matrix product is of the following form:

$$D_4 = \text{quasidiag } (K_0, K_{256}, K_{512}, K_{768})$$

$$K_0 = K_{256} = K_{512} = K_{768} = \text{diagonal } (0)$$

and as above each element repeats 256 times to give $I_{256} \times D_4$, a degenerate case.

In performing the E operation, stored trigonometric data is multiplied with the input data derived from the summers. The trigonometric data is selected from the trig weight tables illustrated in FIG. 4 and in each stage of the computation the trigonometric data is selected and then held to the selected value for either 1, 4, 16, 64 or 256 word times as required to complete the computation of each term. The input data on the other hand is allowed to vary throughout the operation without adverse effect.

The manner of selecting and holding the trigonometric data is conventional and not specifically illustrated. It may take the form of an 8 stage counter that is incremented every word time. The counter outputs are masked according to the stage count and applied as an address to a trigonometric weight memory. Trigonometric weights are thus obtained with a table look-up procedure. The effect of the masking is to access every fourth trig weight and utillize it four times consecutively for the second stage; every 16th trig weight is used 16 times during the third stage; every 64th trig weight is used 64 times consecutively during the fourth stage; etc. No masking is applied during the first stage.

The permutation operation in algorithm 13 takes the following forms in successive stages of the computation:

$$(I_{245} \times P_4) (I_{64} \times P_{16}) (I_{16} \times P_{64}) (I_4 \times P_{256}) (I_1 \times P_{1024}) \quad (32)$$

The permutation operation in equation (13) is implemented with data multiplexing during the transfer of data from registers 46–53 back to registers 38–45. Both elements of complex data are handled simultaneously but on separate paths. (As shown in FIG. 3, the registers 46–53 have four (complex) taps.) After the first stage of complex arithmetic, one word from each tap, in sequence, is accessed and returned to 38–45. After the second stage of computation, four words are taken from each tap before moving to the next tap. After the third stage, 16 words are accessed at each tap; etc. After the fifth stage, taking 256 words from each tap is a trivial multiplexing operation because the Fourier coefficients, by this time, are in natural order. Therefore, the multiplexing amounts to a transfer of data from 46–53 back to 38–45.

The equipment used to reorder the calculated FFT output is simple and easily implemented using shift registers. Because the taps need not be closer than 256 elements apart, a large number of input-output points are not required on the shift register packages.

The arithmetic unit is of flexible application to several important classes of computations involving vector addition and vector multiplication and producing summed indexed products. In these applications, the arithmetic unit may be used in single units where it may be used to perform computations involving expression (1) or variations of it. The unit may be cascaded with similar computational units of the availability of external connections permits the sequence of vector addition (C) and vector multiplication (E) to take place in either forward (CE) or the inverse order (EC). The unit may also be paralleled with other like arithmetic units. In certain algorithms involving complex quantities a particularly efficient combination is a group of four units. In other circumstances, even numbered groups provide efficiency. Groups of paralleled units may also be cascaded with intervening memory elements to compute larger sets of products to achieve higher computational speed. If only moderate computational speed is required, a single group of paralleled arithmetic units may be used recursively with only input and output memories.

As previously noted, the arithmetic unit comprises a vector adder and a vector multiplication logic. We will now undertake a more detailed description of the logical design of these major elements.

The arithmetic unit illustrated in FIG. 1 is constructed on a single silicon chip using large scale integration with metal oxide silicon field effect transistor (MOSFET) technology. It has an 18 pin requirement. As previously noted, there are six data inputs ($d_1$, $d_2$, $d_3$), ($t_1$, $v_2$, $t_2$), four sign control inputs ($c_1$, $c_2$, $c_3$, $c_4$), two intermediate computed outputs ($s_1$, $s_2$) and a final computed output Z. The sign control inputs can be used to dynamically control operations on the corresponding units.

In normal use, however, the $c_1$ and $c_2$ inputs are present to reflect the algebraic quantities $t_1$ and $t_2$, respectively, but they may also reflect a desired present polarity. This latter capability may be used to introduce a sign corresponding to ($j^2$, i.e., $-1$) when the operands are complex.

In addition to the thirteen pins enumerated, the chip requires five additional connections respectively for word length control ($w_m$), phase I and phase 2 ($\phi_1$, $\phi_2$) clocking, and d.c. source ($V_{ss}$) and drain ($V_{dd}$) energization. The word length control $w_m$ is designed to provide flexibility in the lengths of the data words applied to the various inputs. Typically 13 bit times per word are provided with the data inputs $d_1$, $d_2$, $d_3$ and $v_2$ having 10 bits per word, of which the last bit is a sign bit, while the $t_1$ and $t_2$ inputs have 7 significant bits and a separate sign bit. The word marker provides flexibility in the length of the input words and in the bit times per word. At the output of the final $c$ operation summer the output is 12 bits per word of which the last bit is the sign bit.

The clocking is provided by a two phase clock in which the two phases are non-overlapping at the "low" level. The rate is typically 2 MHz but may be varied. The clock pulses normally swing between +5 volts and −12 volts. The d.c. source energization ($V_{ss}$) is +5 volts and the drain ($V_{dd}$) is normally held at ground potential. The timing of the two phase clocking and the data inputs is illustrated in FIG. 7.

The serial two's complementers, elements 21, 23, 27 and 28 in FIG. 1 are illustrated in greater detail in FIG. 8. They are the subject of the separate application of John M. Irwin et al, filed Nov. 4, 1974, U.S. application Ser. No. 520,542, now U.S. Pat. No. 3,914,590, and entitled "Serial Two's Complementer". The two's complementer is designed to take a serial binary number in two's complement notation and change the algebraic sign when desired.

The logical design of the two's complementer is illustrated in FIG. 8. It makes preferential use of NAND devices. The design provides a minimum geometry configuration when implemented using metal oxide semiconductor field effect transistors (MOSFETS) in large scale integration. As shown by the dotted outlines in FIG. 8, the serial two's complementer is composed of two major blocks, a binary storage element and an exclusive NOR. In principle, the circuit senses the first 1 in the input bit stream and then after a one bit delay, inverts the succeeding bits.

The binary storage element is implemented by an inverter 120, two NAND gates 121, 122 and a one bit dynamic delay (123). The input bit stream from the data input source 119 is coupled through inverter 120 to the NAND gate 121, thence through the one bit delay 123 to NAND gate 122. Two other inputs of the NAND gate 122 provide for sign control and reset. The output of the NAND gate 122 is coupled back to a second input of the NAND gate 121 to provide regeneration for the binary storage element.

The exclusive NOR gate is implemented by two NAND gates 124, 125 and an OR gate 126. The NAND gate 124 and the OR gate 126 each have one input connected to the complementary output of the binary storage element. The other inputs of the NAND gate 124 and the OR gate 126 are connected to receive the input bit stream from 119. The output of the NAND gate 124 and the OR gate 126 are connected to the separate inputs of the NAND gate 125, at the output of which the signed output appears.

In the two's complementer, the binary storage element is designed to respond to the first 1 in the input bit stream and to produce a change in output after a one bit delay. The exclusive NOR, which has one input connection coupled to the bit stream from 119 and the other to the complementary output of the binary storage element, is designed to invert the input bit stream when the (complementary) output of the binary storage element goes to a low state. The output of the exclusive NOR provides the negated number.

The serial summer, elements 22, 24 and 29 of FIG. 1, are of conventional design and may be regarded as formed by three principal blocks shown in dotted outline in FIG. 9 and several ancillary delays. The principal blocks are a first exclusive NOR comprising the elements 100, 101 and 102, a second exclusive NOR comprising the elements 103, 104 and 105, and the "Carry Logic and Delay" comprising the elements 108, 109, 110, 111 and 112. The Carry Logic and Delay block develops one bit of time delay through transmission gates 110 and 112. Half bit delays are provided at the input to the first exclusive NOR gate by the transmission gates 98, 99 operating in conjunction with the gates 100 and 102. A half bit of output delay is provided by transmission gate 106 operating in conjunction with inverter 107.

The serial summer functions in the following manner. The A and B bit streams are applied through half bit delays to the first exclusive NOR. The exclusive NOR is composed of two NAND gates 100, 101 and an OR gate 102. The inputs of 100, 102 are connected in parallel to the A and B bit streams. The outputs of the NAND gate 100 and OR gate 102 are coupled to the two inputs of NAND gate 101. The output (A $\overline{\oplus}$ B) of the first exclusive NOR appears at the output of NAND gate 101. Another output ($\overline{A \cdot B}$) is derived from the output of NAND gate 100 and applied to one input of the carry logic and delay block.

The second exclusive NOR of the summer is made up of the NAND gate 103, OR gate 105, and NAND gate 104. The inputs of 103, 105 are paralleled and coupled respectively to the output (A $\overline{\oplus}$ B) of the first exclusive NOR and the carry output ($\overline{C}_{i-1}$) of the Carry Logic and Delay block. The outputs of the NAND gate 103 and OR gate 105 are applied respectively to the two inputs of NAND gate 104. The output (A $\overline{\oplus}$ B)$\overline{\oplus} \overline{C}_{i-1}$ of the second exclusive NOR appears at the output of NAND gate 104 and is coupled to transmission gate 106 and inverter 107 which provides the second one half bit of delay to the bit stream. The summed output A $\oplus$ B $\oplus$ C appears at the output of the inverter 107.

The carry logic and delay is composed of the OR gate 108, NAND gates 109, 111 and transmission gates 110, 112. Gate 108 has one input coupled to the output (A $\overline{\oplus}$ B) of the first exclusive NOR and its output coupled to one input of the NAND gate 109. The other input of the NAND gate 109 is connected to the $\overline{A \cdot B}$ output of NAND gate 100. The output of NAND gate 109 is coupled through the transmission gate 110 to the NAND gate 111, whose other input connection provides the reset function. The output of NAND gate 111 contains the carry ($\overline{C}_{i-1}$) which is delayed one half bit in the transmission gate 112 and coupled in a feedback path back to the other input of OR gate 108.

The logical function of the summer may be outlined in the following table:

| $\overline{C}_{i-1}$ | B | A | $\Sigma$ | $C_i$ | $\overline{C}_i$ |     |
|---|---|---|---|---|---|---|
| 1 | 0 | 0 | 0 | 0 | 1 |     |
| 1 | 0 | 1 | 1 | 0 | 1 |     |
| 1 | 1 | 0 | 1 | 0 | 1 |     |
| 1 | 1 | 1 | 0 | 1 | 0 | (33) |
| 0 | 0 | 0 | 1 | 0 | 1 |     |
| 0 | 0 | 1 | 0 | 1 | 0 |     |
| 0 | 1 | 0 | 0 | 1 | 0 |     |
| 0 | 1 | 1 | 1 | 1 | 0 |     | where
$\overline{C}_i = \overline{AB} + (A \oplus B)\,\overline{C}_{i-1}$;
$+$ denotes the OR function;
$\oplus$ denotes the exclusive OR function;
$\overline{\oplus}$ denotes the exclusive NOR function.

The signed multiplication logics, elements 25 and 26 of FIG. 1, are illustrated in greater detail in FIGS. 10, 11, 12 and 13. They are the subject of the separate application of John Irwin et al filed November 22nd, 1974, U.S. application Ser. No. 526,373, now U.S. Pat. No. 3,947,670, entitled "Signed Multiplication Logic". The signed multiplication logic is designed to accept two serial input data streams and to produce a single precision product also in serial form. In performing the multiplication of two serial input numbers, a very efficient usage of time is achieved. The signed multiplication logic produces a single precision product requiring only one bit more per word than the multiplicand. If the multiplicand is of 12 bits, the output product of 10 bits is formed in an output word interval of 13 bit times. The multiplier is fixed in length; the multiplicand can be variable in length and is usually longer than the multiplier.

The signed multiplication logics (25, 26) perform two quadrant multiplication, which when supplemented by output two's complementers, perform four quadrant multiplications. The multiplicands ($s_2$, $V_2$)

are provided in two's complement notation allowing positive or negative values. The multipliers ($t_1$, $t_2$) are magnitudes only whose signs are introduced separately in the form of the constants ($c_3$, $c_4$) used to control the two complementers 27, 28 (FIG. 1). When this is done, the products at the output of the two's complementer are true four quadrant quantities and contain magnitude and sign information reflecting both operands. The outputs appear in two's complement notation.

The operation of the multiplication logic may best be understood by reference to the block diagram provided in FIG. 10 and to the sequencing diagram of FIG. 11. In the following description it is assumed that the serial multiplier contains seven bits of magnitude information which are applied to the signed multiplier with the least significant bit first in time. Normally, the multiplier is provided with a separate sign bit as well. The serial multiplicand is of twelve bits and appears in two's complement notation with the least significant bit first and the sign bit last. The multiplier and multiplicands are both applied at a word rate consistent with a thirteen bit times per word period. With the foregoing selections, one may obtain a single precision product after a nine bit transport delay rounded from thirteen bits to ten bits and also appearing at a thirteen bit times per word period.

The components of the multiplication logic, their interconnections, their functions, and the sequence in which their functions are performed will now be described. In FIG. 10, the novel signed multiplication logic 25, 26 of FIG. 1 is depicted in a simplified block diagram. The blocks, while not corresponding to logical designations, correspond to "cells", which in the preferred integrated circuit embodiment, are repetitively reproduced in largely identical form throughout the logic. The multiplication logic may be seen to comprise a succession of seven interconnected multiplication or "multiply" input gates 234 through 240, which are cells of a first type, and a summation tree including serial summers 241 through 247, which are cells of a second type. The multiplication cells, among other functions, form the partial products which are summed by the summer cells to form the final product.

The input, internal and output data paths between the cells of the multiplication logic are as follows. The serial multiplier ( $|b|$ ) input data stream available from bus 231 is directly applied to the $b_i$ data input of each multiplication cell (234 to 240).

The serial multiplicand ($a$) input data stream available from line 232 is applied directly to the $a_i$ data input of the initial multiplication cell 234 only and indirectly supplied to each of the $a_i$ data inputs of the multiplication cells 235 to 240 via successive internal one bit delays. The multiplication cells each have internal connections (not shown in FIG. 10) to enter the multiplicand data stream into that cell for generating the partial product associated with that cell. Except for the last, each cell is provided with a path containing a one bit delay for transferring the multiplicand to the next cell. Thus, the multiplicand data stream directly available from line 232 is transferred from multiplication cell 234 with one bit delay to the $a_2$ data input of multiplication cell 235. Similarly, the multiplicand data stream is transferred from multiplication cell 235 to multiplication cell 236, from 236 to 237, from 237 to 238, from 238 to 239, and finally, from 239 to the multiplication cell 240, in which a delay is not used. In all, six bits of delay are provided in transferring the multiplicand from the input of the initial to the input of the terminal multiplication cells. The delays form stages of a shift register for the multiplicand having seven connections at one bit intervals.

The partial products formed in the multiplication cells 234 through 240, which are serial data streams, are supplied to the first rank (241 through 244) of summer cells. In particular, the partial product outputs of multiplication cells 234 and 235 are applied to the two inputs of the serial summer cell 241; the partial product outputs of multiplication cells 236 and 237 are applied to the two inputs of summer cell 242; similar outputs of multiplication cell 238 and 239 are applied to the two inputs of summer cell 243; and finally, the partial product output of the last multiplication cell 240 is applied, with a rounding value, to the two inputs of the last summer cell 244 of the first rank.

The partial products are combined in the summer cells 241 through 247 to obtain the final product. The summers 241 through 247 are arranged in a three rank tree and the process of consolidating the separate streams into a single data stream requires a three bit time interval. The summers of the first rank (241 through 244) each provide a single data stream after one bit of time delay whose value is the sum of the two input data streams. The output data streams of the summer cells 241 and 242 in the first rank are applied to the separate inputs of summer cell 245 in the second rank. The output data streams of the summer cells 241 and 242 in the first rank are applied to the separate inputs of summer cell 245 in the second rank. The output data streams of first rank summer cells 243 and 244 are applied to the separate inputs of the second rank summer cells 246. The outputs of the second rank summer cells 245 and 246, which also appear after one bit of delay, are then applied to the separate inputs of the third rank summer cell 247. The consolidated data streams appear at the output of the serial summer 247 after another bit of delay.

The final product $a \cdot |b|$ of the signed multiplication logic appears at the output line 233. Six bits of time delay are required for the multiplicand to reach the last multiplication cell and three bits of delay are required for summation, making a total transport delay of nine bits. A more particularized understanding of the formation of the product may be obtained from a consideration of the sequencing diagram of FIG. 11.

The sequencing diagram of FIG. 11 illustrates the sequencing of the multiplicand data stream, the multiplier data stream and the formation of the product data stream. The multiplicand $a$ is multiplied by a bit $b_i$ of the multiplier in each multiplication cell (234 to 240) to form each partial product (PP1 to PP7). The partial products are then summed in the summation tree 241 to 247 to form the single precision final product ($a \cdot |b|$). The diagram shows the truncation of the multiplicand, truncation of the final product, rounding of the product to compensate for multiplicand and subsequent product truncation to achieve a single precision output, and sign bit extension for forming validly signed partial products.

The final product $a \cdot |b|$, as implied by the sequencing diagram, is formed by successively multiplying a word of the multiplicand ($a$), taken a word or less at a time, by a word of the multiplier, taken one bit at a time. If a double precision product is sought, the full multiplicand word is used in formation of each partial product. However, if a single precision product is sought, consistent with the precision of the multiplicand and multiplier, then truncation of the multiplicand prior to formation of the product and subsequent rounding of the product is desirable. Truncation, as will be detailed, permits very substantial savings in time and allows for full serial processing of the input and output data streams.

If a single precision product is formed, the multiplicand is successively truncated so that all bits contributing less than a given value to the final product are discarded. With reference to FIG. 11, the value of the bits in the multiplicand increase as one proceeds from $T_1$ to $T_{13}$. In addition, the upper multiplicand tabulations are multiplied by the least significant bits of the multiplier and thus contribute only to the lower valued bits of the final product. The lower multiplicand tabulations are multiplied by the more significant bits of the multiplier and thus contribute to both lower and higher valued bits of the final product. In short, the tabulations of the multiplicand have been successively displaced in such a way in FIG. 11 that the individual bits of the multiplicand contribute values to the final product in direct relation to their position along the bit time coordinate.

The formation of the final product from the partial products PP1 to PP7 is performed by the summation tree of FIG. 10 with a rounding value of 6, earlier alluded to and compensating for the statistical average of the numbers truncated in the multiplicand and truncated (or zeroed) in the product. The rounding value is inserted into the last (244) of the first rank of serial summers. The duration of the word marker (illustrated in FIG. 17) or "timing waveform" controls the truncation triangle of the multiplicand, and the zeroing of the final product. If the duration of the word marker is extended, the truncation triangle may be reduced to zero and product zeroing eliminated so as to obtain a full double precision product without any loss in accuracy. The final product $a \cdot |b|$ is transmitted from the final serial summer 247 at thirteen bit times per word, with the first three bits in times $T_1$ to $T_3$ zeroed. The final single product $a \cdot |b|$ is in a ten bit, two's complement format occurring at thirteen bit times per word.

In summary, the sequencing diagram of FIG. 11 illustrates the entry of the multiplier $|b|$ and the multiplicand ($a$) and the formation of the final single precision product $a \cdot |b|$. The manipulation of the multiplier, the multiplicand, the two truncations, one of which is involved in rounding, and extension of the two's complement sign for variable word length partial products, is the concern of the following discussion. The details of the individual cells making up the multiplication logic and the timing of the multiplication process will now be discussed.

Figure 13:
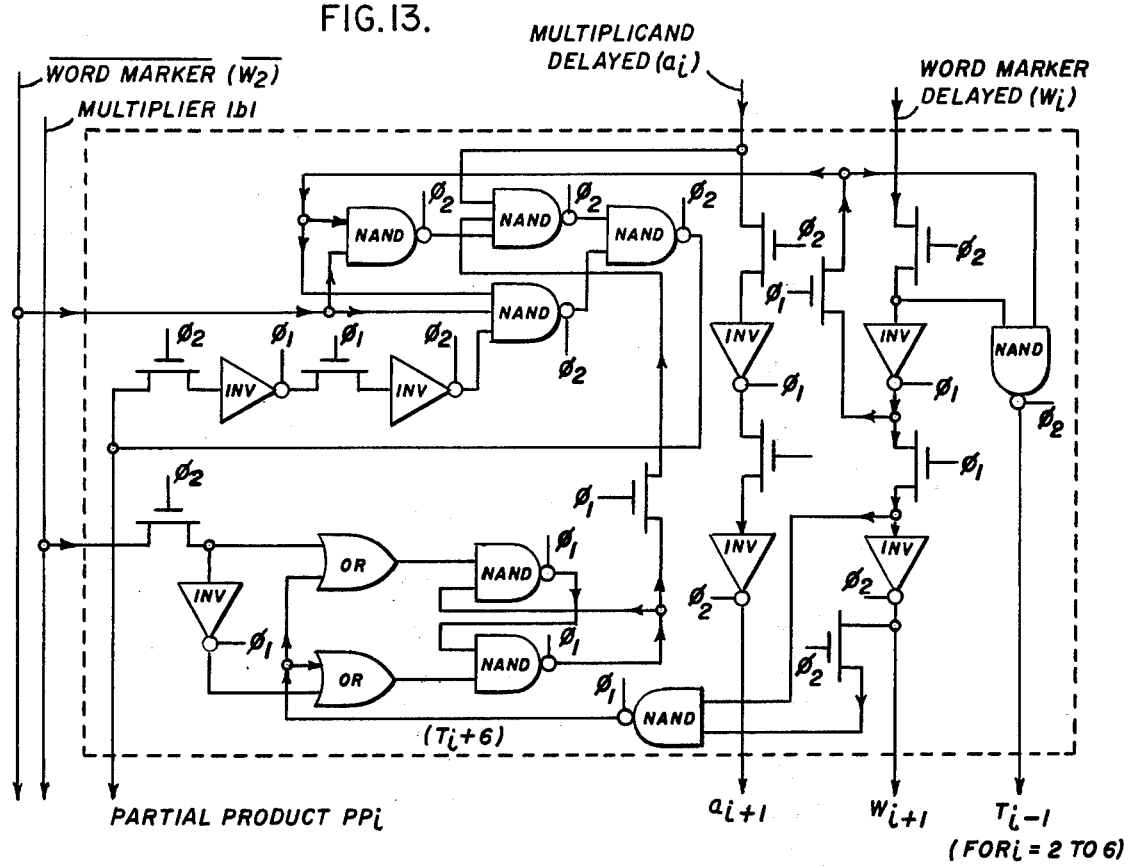
FIG. 13 is the logic diagram of a multiply input gate forming a block used repetitively in the multiplication logic.

The multiplication cell is illustrated in the logical design given in FIG. 13. The logical design in FIG. 13 employs "MOSFET" technology in which NAND gate configurations are most desirable in their use of minimum substrate areas.

As earlier described in connection with FIG. 10, the summers 241 to 247 arranged in three ranks cosolidate the seven bit streams from the multiplication input gates 234 to 240 into a single bit stream representing the sum of the individual bit streams. The consolidation requires one bit of time delay per rank. The summers operate in synchronism with the multiplication gates and any internally stored carry is reset as the least significant bit of each word passes through. The first rank of summers 241 to 244 have their internally stored carries reset by a signal of the nominal bit time $T_1$ which is available from the NAND gate corresponding to 96 of the second multiplication cell 235. The second rank of summers 245 and 246 are reset by signal at the nominal bit time $T_2$ available from the NAND gate corresponding to 96 of the third multiplier cell 236. The final summer 247 is reset by a signal at the nominal bit time of $T_3$ available from the NAND gate corresponding to 296 of the fourth multiplier cell 237. All of the summers are alkike except for the last (247) wherein an output NOR gate is substituted for an inverter for zeroing the last three digits of the product.

Figure 14:
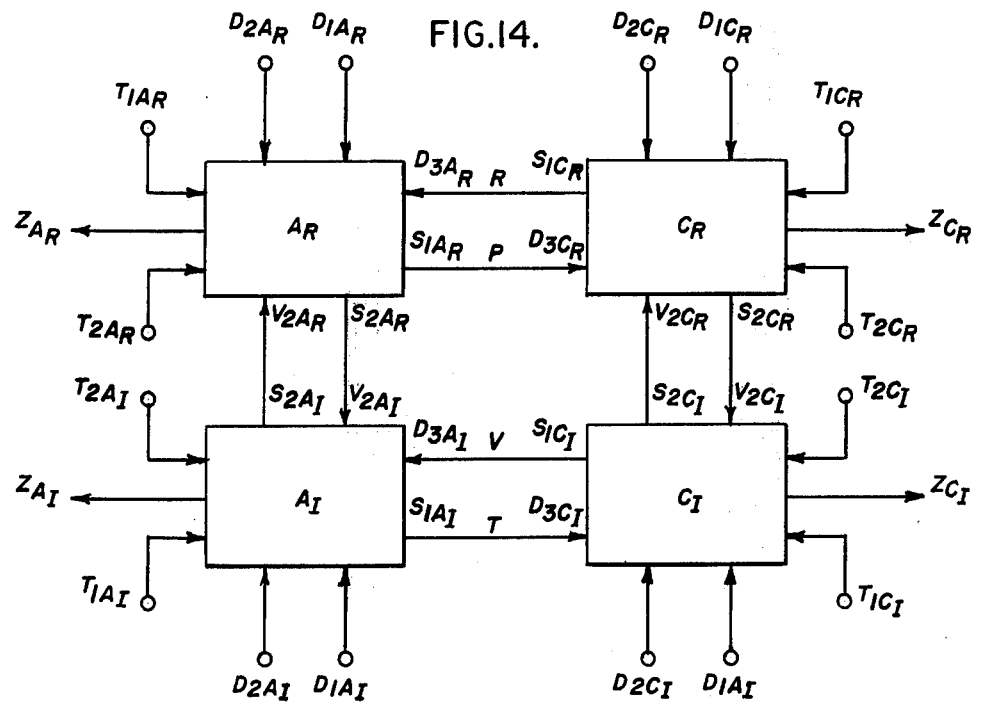
FIG. 14 is a block diagram illustrating the optimum interconnection of four arithmetic units in an FFT application like that in FIG. 3.

As previously indicated, the arithmetic units are efficiently coupled into paralleled groups when it is desired to increase the capacity to compute summed indexed products. FIGS. 5 and 6 illustrate optimum interconnection sequences for the combination and the multiplication steps. FIG. 14 illustrates a particularly efficient interconnection of four arithmetic units designated, respectively, $A_r$, $A_i$, $C_r$ and $C_i$, taking into account both combination and multiplication. Each arithmetic unit operates upon two sets of three data inputs, requires four sign control settings, produces two intermediate computed outputs and a final computed output. By virtue of the interconnections, the total number of external data inputs is reduced from six to four per unit and two data inputs are shared between units. In particular there are four external inputs to the arithmetic unit $A_r$ ($d_{1Ar}$, $d_{2Ar}$, $t_{1Ar}$, $t_{2Ar}$); four external inputs to arithmetic unit $A_i$ ($d_{1Ai}$, $d_{2Ai}$, $T_{1Ai}$, $t_{2Ai}$); four external arithmetic inputs to arithmetic unit $C_r$ ($d_{1Cr}$, $d_{2Cr}$, $t_{1Cr}$, $t_{2Cr}$); and finally four external inputs to the fourth arithmetic unit $C_i$ ($d_{1Ci}$, $d_{2Ci}$, $i_{1Ci}$, $t_{2Ci}$).

The two shared data inputs are derived from the $s_1$ and $s_2$ intermediate outputs and are applied to the $d_3$ and $v_2$ inputs. In particular, the $s_1$ output of the $A_r$ unit ($s_{1Ar}$) is coupled to the $d_3$ input of the $C_r$ arithmetic unit ($d_3 Cr$); the $s_1$ output of the $C_r$ arithmetic unit ($s_{1Cr}$) is coupled to the $d_3$ input of the $A_r$ unit ($d_{3Ar}$). Similarly, the $s_{1Ai}$ is coupled to $d_{3Ci}$ and $s_{1Ci}$ is coupled to $d_{3Ai}$. The $s_2$ output of $A_r$ arithmetic unit ($s_{2Ar}$) is coupled to the $v_2$ input of $A_i$ ($v_{2Aai}$); the $s_2$ output of $A_i$ arithmetic unit ($s_{2Ai}$) is coupled to the $v_2$ input of $A_r$ ($v_{2Ar}$). Similarly, $s_2Cr$ is coupled to $v_{2Ci}$ and $s_{2Ci}$ is coupled to $v_{2Cr}$.

Assuming that the four control inputs ($C_1$ to $C_4$) of each unit are similarly subscripted, the four units perform the following overal function:

$$\begin{bmatrix} z_{Ar} \\ z_{Ai} \\ z_{Cr} \\ z_{Ci} \end{bmatrix} = \begin{bmatrix} c_{4Ar} t_{2Ar} v_{2Ar} + c_{3Ar} t_{1Ar} [d_{3Ar} + c_{2Ar} (d_{2Ar} + c_{1Ar} d_{1Ar})] \\ c_{4Ai} t_{2Ai} v_{2Ai} + c_{3Ai} t_{1Ai} [d_{3Ai} + c_{2Ai} (d_{2Ai} + c_{1Ai} d_{1Ai})] \\ c_{4Cr} t_{2Cr} v_{2Cr} + c_{3Cr} t_{1Cr} [d_{3Cr} + c_{2Cr} (d_{2Cr} + c_{1Cr} d_{1Cr})] \\ c_{4Ci} t_{2Ci} v_{2Ci} + c_{3Ci} t_{1Ci} [d_{3Ci} + c_{2Ci} (d_{1Ci} + c_{1Ci} d_{1Ci})] \end{bmatrix} \quad (34)$$

The foregoing computation may be restated as follows:

$$\begin{bmatrix} z_{Ar} \\ z_{Ar} \\ z_{Cl} \\ z_{Cl} \end{bmatrix} = \begin{bmatrix} \pm t_{2Ar} v_{2Ar} \pm t_{1Ar} [d_{3Ar} \pm (d_{2Ar} \pm d_{1Ar})] \\ \pm t_{2Al} v_{2Al} \pm t_{1Al} [d_{3Al} \pm (d_{2Al} \pm d_{1Al})] \\ \pm t_{2Cr} v_{2Cr} \pm t_{1Cr} [d_{3Cr} \pm (d_{2Cr} \pm d_{1Cr})] \\ \pm t_{2Cl} v_{2Cl} \pm t_{1Cl} [d_{3Cl} \pm (d_{2Cl} \pm d_{1Cl})] \end{bmatrix} \quad (34')$$

Assuming for reasons that will shortly become evident that eight arithmetic units are paralleled from two sets of four arithmetic units ($A_r$, $A_i$, $C_r$, $C_i$), ($B_r$, $B_i$, $D_r$, $D_i$), and that the $t_1$ inputs of $A_r$ and $A_i$; $B_r$ and $B_i$; $C_r$ and $C_i$; and $D_r$ and $D_i$ are interconnected, and designated respectively $t_{1A}$, $t_{1B}$, $t_{1C}$, $t_{1D}$; and that the $t_2$ inputs of $A_r$ and $A_i$; $B_r$ and $B_i$; $C_r$ and $C_i$; and $D_r$ and $D_i$ are interconnected and designated respectively $t_{2A}$, $t_{2B}$, $t_{2C}$, $t_{2D}$, the following function will be performed:

$$\begin{bmatrix} z_{Ar} \\ z_{Al} \\ z_{Br} \\ z_{Bl} \\ z_{Cr} \\ z_{Cl} \\ z_{Dr} \\ z_{Dl} \end{bmatrix} = \begin{bmatrix} c_{4Ar} t_{2A} v_{2Ar} + c_{3Ar} t_{1A} [d_{3Ar} + c_{2Ar} (d_{2Ar} + c_{1Ar} d_{1Ar})] \\ c_{4Al} t_{2A} v_{2Al} + c_{3Al} t_{1A} [d_{3Al} + c_{2Al} (d_{2Al} + c_{1Al} d_{1Al})] \\ c_{4Br} t_{2B} v_{2Br} + c_{3Br} t_{1B} [d_{3Br} + c_{2Br} (d_{2Br} + c_{1Br} d_{1Br})] \\ c_{4Bl} t_{2B} v_{2Bl} + c_{3Bl} t_{1B} [d_{3Bl} + c_{2Bl} (d_{2Bl} + c_{1Bl} d_{1Bl})] \\ c_{4Cr} t_{2C} v_{2Cr} + c_{3Cr} t_{1C} [d_{3Cr} + c_{2Cr} (d_{2Cr} + c_{1Cr} d_{1Cr})] \\ c_{4Cl} t_{2C} v_{2Cl} + c_{3Cl} t_{1C} [d_{3Cl} + c_{2Cl} (d_{2Cl} + c_{1Cl} d_{1Cl})] \\ c_{4Dr} t_{2D} v_{2Dr} + c_{3Dr} t_{1D} [d_{3Dr} + c_{2Dr} (d_{2Dr} + c_{1Dr} d_{1Dr})] \\ c_{4Dl} t_{2D} v_{2Dl} + c_{3Dl} t_{1D} [d_{3Dl} + c_{2Dl} (d_{2Dl} + c_{1Dl} d_{1Dl})] \end{bmatrix} \quad (35)$$

If now one substitutes for the constants the $\pm$ values that they may assume, and assigns to the $t$ variables the following trigonometric values, the following function will be performed:

$$\begin{bmatrix} z_{Ar} \\ z_{Al} \\ z_{Br} \\ z_{Bl} \\ z_{Cr} \\ z_{Cl} \\ z_{Dr} \\ z_{Dl} \end{bmatrix} = \begin{bmatrix} \pm \sin 0 \; v_{2Ar} \pm \cos 0 \; [d_{3Ar} \pm (d_{2Ar} \pm d_{1Ar})] \\ \pm \sin 0 \; v_{2Al} \pm \cos 0 \; [d_{3Al} \pm (d_{2Al} \pm d_{1Al})] \\ \pm \sin \alpha \; v_{2Br} \pm \cos \alpha \; [d_{3Br} \pm (d_{2Br} \pm d_{1Br})] \\ \pm \sin \alpha \; v_{2Bl} \pm \cos \alpha \; [d_{3Bl} \pm (d_{2Bl} \pm d_{1Bl})] \\ \pm \sin 2\alpha \; v_{2Cr} \pm \cos 2\alpha \; [d_{3Cr} \pm (d_{2Cr} \pm d_{1Cr})] \\ \pm \sin 2\alpha \; v_{2Cl} \pm \cos 2\alpha \; [d_{3Cl} \pm (d_{2Cl} \pm d_{1Cl})] \\ \pm \sin 3\alpha \; v_{2Dr} \pm \cos 3\alpha \; [d_{3Dr} \pm (d_{2Dr} \pm d_{1Dr})] \\ \pm \sin 3\alpha \; v_{2Dl} \pm \cos 3\alpha \; D_{3Dl} \pm (d_{2Dl} \pm d_{1Dl})] \end{bmatrix} \quad (35')$$

The arithmetic unit herein disclosed has a greatly reduced pin count in respect to what might have been required because the flow of data in and out of the chip is in serial and not parallel format. Thus, although there are six data inputs — they require only six pins. Likewise, the three data outputs require only three pins. Had the data been inputed in parallel format the pin count for each input depending on word length would have been a typical 10 pins. Such a high pin count would have precluded the degree of integration herein achieved.

The unit, as a natural consequence of serial data handling, is readily organized in combination with tapped serial memories, for word parallel operation. The tapped serial memories and other registers assist in performing the permutation or ideal shuffle operation. The configuration provides an easy expansion of computational capacity into several bit serial, word parallel paths among the arithmetic units.

While a particular matrix processor using a single set of eight arithmetic units has been shown, it should be evident that other similar configurations utilizing the same general principles may be formed. For instance, in the event that the same computation is to be performed in a shorter time, the multiplexing features of the FIG. 3 embodiment may be eliminated and the additional arithmetic units may be added to avoid the need for iterative use. Thus, instead of a single set of eight arithmetic units in which the data is recirculated some five times, one may use an arrangement wherein five sets of arithmetic units are provided connected in cascade with (or without) intervening serial shift registers to transfer the data between successive stages. Similarly, lesser or larger numbers of arithmetic units may be employed in each set in either the iterative or the cascaded configuration.

A significant economic factor in matrix processors using the arithmetic unit is that the unit, which performs both the matrix addition operation (C function) and the multiplication operation with a diagonal matrix (the E function), permits one to use low cost serial memories to perform the permutation (P) function. These serial memories may be shift registers, normally aided by multiplexers in the iterative arrangements. Shift registers are often lower in cost than other data storage devices (as, for instance, random access memories) and may represent a substantial part of the total cost of a processor. In addition, the arithmetic units are themselves intrinsically low cost due to their high degree of device and interconnection integration. Because of the ease with which the units may be interconnected to increase or decrease capacity, the units are highly flexible, and may be used in widely variant matrix processing operations. With greater volume of use, the cost per arithmetic unit is reduced. Thus, the arithmetic unit herein described permits a cost improvement in a complex matrix processor by an order of magnitude over prior processors using conventional single purpose integrated circuits.

The arithmetic unit by itself has been optimized in terms of yield and simplicity of interconnections to include three signed summers and two signed single precision multiplication means. Means have been described for interconnecting the units very efficiently into sets of four or eight. The individual arithmetic units contain typically 1330 active semiconductor devices which represent a current practical chioce for a single integrated circuit, considering yield and other factors. In the event that the art of integrated circuit processing improves, one may combine a greater number of functions on a single chip. A second or a third next natural step is with two units or four such units combined. The latter form is illustrated in FIG. 14.

The arithmetic unit is specifically intended for processing words of any length greater than, or equal to, 13 bit times. The timing information in FIG. 7 illustrates a case in which 13 bit times are used to process each word. Word length at the arithmetic unit interfaces is three bits less, or 10 bits minimum, but the 3 additional bit slots are required because data is serial. The word marker is used to define and control the word processing time. The word marker is "low" for 7 bit times and "high" for 6 or more bit times, depending upon the selected actual word processing interval. Internal logic in the arithmetic unit will properly reset carries, pass properly signed partial products, and round for the appropriate word length, when the word marker waveform is so chosen. The transport delay through the arithmetic unit, measured from LSB at D1 or D2 to LSB at OUT, is constant, having a value of 15 bit times for a representative implementation.

The direct (forward) and inverse (backward) transformations are both implemented with equal ease. The required conjugation of the complex numbers can be actuated by sign control of the two's complementers. This corresponds to making the appropriate changes in sign; for example, as in equation (21) and (22) to obtain the direct transformation.

What is claimed as new and desired to be secured by Letters Patent of the United States is:

1. An arithmetic unit suitable for large scale integration for computing summed indexed products comprising:
   1. a vector adder for bit serial, word serial binary data containing sign and magnitude information, comprising:
      a. a first sign changing means to which serial binary data is applied from a first data input terminal ($d_1$) and subject to a first sign control input ($c_1$),
      b. a first serial summer to which two serial binary data streams are applied respectively from the output of said first sign changing means and from a second data input terminal ($d_2$), said summer producing a first output quantity ($s_1$) where $$s_1 = (d_2 \pm d_1)$$

c. a second sign changing means to which serial binary data is applied from said first summer and subject to a second sign control input ($c_2$),
      d. a second serial summer to which two serial binary data streams are applied respectively from the output of said second sign changing means and from the output of a third data input terminal ($d_3$), said summer producing a second output quantity ($s_2$), where $$s_2 = [d_3 \pm (d_2 \pm d_1)]$$

2. a vector multiplication logic for bit serial, word serial binary data, containing sign and magnitude information, comprising
      a. first multiplication means having a multiplicated input coupled to the output of said second serial summer and a multiplier input coupled to a fourth data input terminal ($t_1$),
      b. second multiplication means having a multiplicated input coupled to a fifth data input terminal ($v_2$), and to a multiplier input coupled to a sixth data input terminal ($t_2$),
      c. a third sign changing means to which serial binary data is applied from said first multiplication means and subject to a third sign control input ($c_3$),
      d. a fourth sign changing means to which serial binary data is applied from said second multiplication means and subject to a fourth sign control input ($c_4$),
      e. a third serial summer to which two serial binary data streams are applied respectively from the outputs of said third and fourth sign changing means, said third serial summer producing a third output quantity:

$$\left\{ \underset{f(c_4)}{\pm} t_2 v_2 \underset{f(c_3)}{\pm} t_1 [d_3 \underset{f(c_2)}{\pm} (d_2 \underset{f(c_1)}{\pm} d_1)] \right\}$$

wherein the first sign selection in the expression is dependent on $c_4$,
   the second sign selection is dependent on $c_3$
   the third sign selection is dependent on $c_2$, and
   the fourth sign selection is dependent on $c_1$.

2. An arithmetic unit as set forth in claim 1 wherein said vector adder accepts serial binary data inputs at said first ($d_1$), second ($d_2$) and third ($d_3$) data input terminals and produces serial binary data outputs in two's complement notation, least significant bit first in time and the sign bit last, and wherein
   said first and second sign changing means are each two's complementers.

3. An arithmetic unit as set forth in claim 2 wherein said vector multiplication logic multiplies numbers in serial binary data format to obtain products in serial binary data format:
   a. the multiplicand inputs of the first and second multiplication means accept sign and magnitude information in two's complement notation, least significant bit first in time and the sign bit last;
   b. the multiplier inputs of said first and second multiplication means accept magnitude-only information; and
   c. the products of said first and second multiplication means contain sign and magnitude data in two's complement notation, least significant bit first in time and the sign bit last.

4. An arithmetic unit as set forth in claim 3 wherein the third and fourth sign changing means are each two's complementers.

5. An arithmetic unit as set forth in claim 4 wherein:
   a. sign information associated with the multiplier input of said first multiplication means is applied to the control input ($c_3$) of said third sign changing means, and wherein
   b. sign information associated with the multiplier input of said second multiplication means is applied to the control input ($c_4$) of said fourth sign changing means.

6. An arithmetic unit as set forth in claim 5 wherein said first and second multiplication means yield single precision products, said multiplier, multiplicand and product bit streams occurring serially at equal word rates with the least significant bit first in time.

7. An arithmetic unit as set forth in claim 6 suitable for computing summed indexed products wherein the indexed quantities include products of signed data and trigonometric data terms containing orthogonal elememts; wherein the signed data is applied to the first ($d_1$), second ($d_2$), third ($d_3$) and fifth ($v_2$) data input terminals and the orthogonal trigonometric data is applied to the fourth ($t_1$) and sixth ($t_2$) data input terminals; said orthogonality reducing change in word length in the output of said third summer resulting from change in the trigonometric data, wherein a bit time of the word processing period is saved.

8. An arithmetic unit as set forth in claim 7 wherein each trigonometric data term is a sine and cosine of the same angle.

9. Apparatus for computing summed index products comprising a set of four arithmetic units ($A_r$, $A_i$, $C_r$, $C_i$), each unit comprising:

1. a vector adder for bit serial, word serial binary data containing sign and magnitude information, comprising:
   a. a first sign changing means to which serial binary data is applied from a first data input terminal ($d_1$) and subject to a first sign control input ($c_1$),
   b. a first serial summer to which two serial binary data streams are applied respectively from the output of said first sign changing means and from a second data input terminal ($d_2$), said summer producing a first output quantity ($s_1$), where $$s_1 = (d_2 \pm d_1)$$

c. a second sign changing means to which serial binary data is applied from said first summer and subject to a second sign control input ($c_2$),
   d. a second serial summer to which two serial binary data streams are applied respectively from the output of said second sign changing means and from the output of a third data input terminal ($d_3$), said summer producing a second output quantity ($s_2$), where $$s_2 = [d_3 \pm (d_2 \pm d_1)]$$

2. a vector multiplication logic for bit serial, word serial binary data, containing sign and magnitude information, comprising:
   a. first multiplication means having a multiplicand input coupled to the output of said second serial summer and a multiplier input coupled to a fourth data input terminal ($t_1$),
   b. second multiplication means having a multiplicand input coupled to a fifth data input terminal ($v_2$), and to a multiplier input coupled to a sixth data input terminal ($t_2$),
   c. a third sign changing means to which serial binary data is applied from said first multiplication means and subject to a third sign control input ($c_3$),
   d. a fourth sign changing means to which serial binary data is applied from said second multiplication means and subject to a fourth sign control input ($c_4$),
   e. a third serial summer to which two serial binary data streams are applied respectively from the outputs of said third and fourth sign changing means, said third serial summer producing a third output quantity Z:

$$Z = \tfrac{1}{4}\left\{ \underset{f(c_4)}{\pm}\, t_2 v_2 \underset{f(c_3)}{\pm}\, t_1\, [d_3 \underset{f(c_2)}{\pm}\, (d_2 \underset{f(c_1)}{\pm}\, d_1)] \right\}$$

said units being interconnected as follows:
   the $s_1$ output of $A_r$ ($s_{1Ar}$) is coupled to the $d_3$ input of $C_r$, and the $s_1$ output of $C_r$ ($s_{1Cr}$) is coupled to the $d_3$ input of $A_r$,
   the $s_1$ output of $A_i$ ($s_{1Ai}$) is coupled to the $d_3$ input of $C_i$, and the $s_1$ output of $C_i$ ($s_{1Ci}$) is coupled to the $d_3$ input of $A_i$,
   the $s_2$ output of $A_r$ ($s_{2Ar}$) is coupled to the $v_2$ input of $A_i$, and the $s_2$ output of $A_i$ ($s_{2Ai}$) is coupled to the $v_2$ input of $A_r$,
   the $s_2$ output of $C_r$ ($s_{2Cr}$) is coupled to the $v_2$ input of $C_i$, and the $s_2$ output of $C_i$ ($s_{2Ci}$) is coupled to the $v_2$ input of $C_r$, so as to provide the overall function of:

$$\begin{bmatrix} z_{Ar} \\ z_{Ai} \\ z_{Cr} \\ z_{Ci} \end{bmatrix} = \begin{bmatrix} c_{4Ar}\, t_{2Ar}\, v_{2Ar} + c_{3Ar}\, t_{1Ar}\, [d_{3Ar} + c_{2Ar}\, (d_{2Ar} + c_{1Ar}\, d_{1Ar})] \\ c_{4Ai}\, t_{2Ai}\, v_{2Ai} + c_{3Ai}\, t_{1Ai}\, [d_{3Ai} + c_{2Ai}\, (d_{2Ai} + c_{1Ai}\, d_{1Ai})] \\ c_{4Cr}\, t_{2Cr}\, v_{2Cr} + c_{3Cr}\, t_{1Cr}\, [d_{3Cr} + c_{2Cr}\, (d_{2Cr} + c_{1Cr}\, d_{1Cr})] \\ c_{4Ci}\, t_{2Ci}\, v_{2Ci} + c_{3Ci}\, t_{1Ci}\, [d_{3Ci} + c_{2Ci}\, (d_{2Ci} + c_{1Ci}\, d_{1Ci})] \end{bmatrix}$$

wherein $d_{1Ar}$, $d_{1Ai}$, $d_{1Cr}$, $d_{1Ci}$; $d_{2Ar}$, $d_{2Ai}$, $d_{2Cr}$, $d_{2Ci}$; $d_{3Ar}$, $d_{3Ai}$, $d_{3Cr}$, $d_{3Ci}$; $t_{1Ar}$, $t_{1Ai}$, $t_{1Cr}$, $t_{1Ci}$; $v_{2Ar}$, $v_{2Ai}$, $v_{2Cr}$, $v_{2Ci}$; $t_{2Ar}$, $t_{2Ai}$, $t_{2Cr}$, $t_{2Ci}$ denote the serial data inputs ($d_1$, $d_2$, $d_3$, $t_1$, $v_2$, $t_2$) of the subscripted arithmetic units ($A_r$, $A_i$, $C_r$, $C_i$);

wherein $c_{1Ar}$, $c_{1Ai}$, $c_{1Cr}$, $c_{1Ci}$; $c_{2Ar}$, $c_{2Ai}$, $c_{2Cr}$, $c_{2Ci}$; $c_{3Ar}$, $c_{3Ai}$, $c_{3Cr}$, $c_{3Ci}$; $c_{4Ar}$, $c_{4Ai}$, $c_{4Cr}$, $c_{4Ci}$ denote the sign control settings ($c_1$, $c_2$, $c_3$, $c_4$) applied to the subscripted arithmetic units ($A_r$, $A_i$, $C_r$, $C_i$), and $z_{Ar}$, $z_{Ai}$, $z_{Cr}$, $z_{Ci}$) denote the ($z$) serial data outputs of the subscripted arithmetic units ($A_r$, $A_i$, $C_r$, $C_i$) as a function of the inputs and control settings.

10. Apparatus as set forth in claim 9 comprisng two sets of four arithmetic units ($A_r$, $A_i$, $C_r$, $C_i$) and ($B_r$, $B_i$, $D_r$, $D_i$), the latter set being interconnected in the following manner:
   the $s_1$ output of $B_r$ ($s_{1Br}$) is coupled to the $d_3$ input of $D_r$, and the $s_1$ output of $D_r$ ($s_{1Dr}$) is coupled to the $d_3$ input of $B_r$,
   the $s_1$ output of $B_i$ ($s_{1Bi}$) is coupled to the $d_3$ input of $D_i$, and the $s_1$ output of $D_i$ ($s_{1Di}$) is coupled to the $d_3$ input of $B_i$,
   the $s_2$ output of $B_r$ ($s_{2Br}$) is coupled to the $v_2$ input of $B_i$, and the $s_2$ output of $B_i$ ($s_{2Bi}$) is coupled to the $v_2$ input of $B_r$,
   the $s_2$ output of $D_r$ ($s_{2Dr}$) is coupled to the $v_2$ input of $D_i$, and the $s_2$ output of $D_i$ ($s_{2Di}$) is coupled to the $v_2$ input of $D_4$, and
   the $t_1$ inputs of $A_r$ and $A_i$; $B_r$ and $B_i$; $C_r$ and $C_i$; and $D_r$ and $D_i$ are interconnected and designated respectively $t_{1A}$, $t_{1B}$, $t_{1C}$, $t_{1D}$; and
   the $t_2$ inputs of $A_r$ and $A_i$; $B_r$ and $B_i$; $C_r$ and $C_i$; and $D_r$ and $D_i$ are interconnected and designated respectively $t_{2A}$, $t_{2B}$, $t_{2C}$, $t_{2D}$, so as to provide the overall function of:

$$\begin{bmatrix} z_{Ar} \\ z_{Ai} \\ z_{Br} \\ z_{Bi} \\ z_{Cr} \\ z_{Ci} \\ z_{Dr} \\ z_{Di} \end{bmatrix} = \begin{bmatrix} c_{4Ar} t_{2A} v_{2Ar} + c_{3Ar} t_{1A} [d_{3Ar} + c_{2Ar} (d_{2Ar} + c_{1Ar} d_{1Ar})] \\ c_{4Ai} t_{2A} v_{2Ai} + c_{3Ai} t_{1A} [d_{3Ai} + c_{2Ai} (d_{2Ai} + c_{1Ai} d_{1Ai})] \\ c_{4Br} t_{2B} v_{2Br} + c_{3Br} t_{1B} [d_{3Br} + c_{2Br} (d_{2Br} + c_{1Br} d_{1Br})] \\ c_{4Bi} t_{2B} v_{2Bi} + c_{3Bi} t_{1B} [d_{3Bi} + c_{2Bi} (d_{2Bi} + c_{1Bi} d_{1Bi})] \\ c_{4Cr} t_{2C} v_{2Cr} + c_{3Cr} t_{1C} [d_{3Cr} + c_{2Cr} (d_{2Cr} + c_{1Cr} d_{1Cr})] \\ c_{4Ci} t_{2C} v_{2Ci} + c_{3Ci} t_{1C} [d_{3Ci} + c_{2Ci} (d_{2Ci} + c_{1Ci} d_{1Ci})] \\ c_{4Dr} t_{2D} v_{2Dr} + c_{3Dr} t_{1D} [d_{3Dr} + c_{2Dr} (d_{2Dr} + c_{1Dr} d_{1Dr})] \\ c_{4Di} t_{2D} v_{2Di} + c_{3Di} t_{1D} [d_{3Di} + c_{2Di} (d_{2Di} + c_{1Di} d_{1Di})] \end{bmatrix}$$

11. Apparatus as set forth in claim 10 for computation of the Fast Fourier Transform wherein the $c$ constants are sign control settings assuming values of + or −1:

$t_{1A}, t_{1B}, t_{1C}, t_{1D}$ are respectively the cos 0, cos$\alpha$, cos 2$\alpha$, cos 3$\alpha$, $t_{2A}, t_{2B}, t_{2C}, t_{2D}$ are respectively the sin 0, sin $\alpha$, sin 2$\alpha$, sin 3$\alpha$, so as to provide the overall function of:

$$\begin{bmatrix} z_{Ar} \\ z_{Ai} \\ z_{Br} \\ z_{Bi} \\ z_{Cr} \\ z_{Ci} \\ z_{Dr} \\ z_{Di} \end{bmatrix} = \begin{bmatrix} \pm \sin 0 \; v_{2Ar} \pm \cos 0 \; [d_{3Ar} \pm (d_{2Ar} \pm d_{1Ar})] \\ \pm \sin 0 \; v_{2Ai} \pm \cos 0 \; [d_{3Ai} \pm (d_{2Ai} \pm d_{1Ai})] \\ \pm \sin \alpha \; v_{2Br} \pm \cos \alpha \; [d_{3Br} \pm (d_{2Br} \pm d_{1Br})] \\ \pm \sin \alpha \; v_{2Bi} \pm \cos \alpha \; [d_{3Bi} \pm (d_{2Bi} \pm d_{1Bi})] \\ \pm \sin 2\alpha \; v_{2Cr} \pm \cos 2\alpha \; [d_{3Cr} \pm (d_{2Cr} \pm d_{1Cr})] \\ \pm \sin 2\alpha \; v_{2Ci} \pm \cos 2\alpha \; [d_{3Ci} \pm (d_{2Ci} \pm d_{1Ci})] \\ \pm \sin 3\alpha \; v_{2Dr} \pm \cos 3\alpha \; [d_{3Dr} \pm (d_{2Dr} \pm d_{1Dr})] \\ \pm \sin 3\alpha \; v_{2Di} \pm \cos 3\alpha \; [d_{3Di} \pm (d_{2Di} \pm d_{1Di})] \end{bmatrix}$$

12. In a matrix processor for complex data, the combination comprising:
   a. a first serial input memory for real input data having a succession of evenly spaced taps for permuting the input data into an ideal shuffle,
   b. a second serial input memory for imaginary input data having a succession of evenly spaced taps for permuting the input data into an ideal shuffle,
   c. a plurality of vector adders each connected to at least two of said taps to produce real and imaginary, positive and negative outputs in accordance with the matrix $$\begin{bmatrix} 1 & 1 & 1 & 1 \\ \text{-continued} \\ 1 & j & -1 & -j \\ 1 & -1 & 1 & -1 \\ 1 & -j & -1 & j \end{bmatrix}$$

d. a like numbered plurality of vector multipliers, each multiplier in turn comprising a pair of multiplication means, each pair followed by summer with sign changing means, each multiplication means having one input connected to one output of a vector adder and another input connected to a serial source of complex data, said inputs to both multiplication means in a given vector multiplier being selected to provide either a real or an imaginary output, the outputs of said two multiplication means in a given vector multiplier being selected to provide either a real or an imaginary output, the outputs of said two multiplication means in each vector multiplier being combined to generate the real and imaginary elements of complex data,
   e. a real serial output memory for serially ordering the real processed data in accordance with the selected data information, and
   f. an imaginary serial output memory for serially ordering the imaginary processed data in accordance with the selected data permutation.

13. The combination set forth in claim 12 for computation of the Fast Fourier Transform wherein said second source of complex data is a pair of real and imaginary inputs corresponding to stored trigonometric weights equal to sine and cosine functions of angles selected in accordance with the number of resolution points in the transform.

* * * * *